United States Patent
Chang et al.

(10) Patent No.: US 11,215,762 B2
(45) Date of Patent: Jan. 4, 2022

(54) OPTICAL DEVICE PACKAGE AND METHOD FOR MANUFACTURING THE SAME

(71) Applicant: Advanced Semiconductor Engineering, Inc., Kaohsiung (TW)

(72) Inventors: Huang-Hsien Chang, Kaohsiung (TW); Po Ju Wu, Kaohsiung (TW); Yu Cheng Chen, Kaohsiung (TW); Wen-Long Lu, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 430 days.

(21) Appl. No.: 15/998,408

(22) Filed: Aug. 15, 2018

(65) Prior Publication Data

US 2020/0057201 A1  Feb. 20, 2020

(51) Int. Cl.
  *G02B 6/44* (2006.01)
  *G02B 6/36* (2006.01)
  *G02B 6/42* (2006.01)

(52) U.S. Cl.
  CPC ......... *G02B 6/3636* (2013.01); *G02B 6/4257* (2013.01); *G02B 6/44* (2013.01)

(58) Field of Classification Search
  CPC .. G02B 6/3636; G02B 6/3652; G02B 6/4257; G02B 6/44; G02B 6/3628; G02B 6/3644; G02B 6/3648; G02B 6/3632
  See application file for complete search history.

(56) References Cited

U.S. PATENT DOCUMENTS

| | | | |
|---|---|---|---|
| 6,316,281 B1 | 11/2001 | Lee et al. | |
| 6,321,020 B1 * | 11/2001 | Fukuyama | G02B 6/3636 385/137 |
| 2001/0040240 A1 * | 11/2001 | Tatoh | G02B 6/4257 257/81 |
| 2002/0037137 A1 * | 3/2002 | Wu | G02B 6/423 385/49 |
| 2004/0146248 A1 * | 7/2004 | Hong | G02B 6/136 385/49 |
| 2009/0246905 A1 * | 10/2009 | Badehi | G02B 6/10 438/65 |
| 2014/0362457 A1 | 12/2014 | Nadeau et al. | |

* cited by examiner

*Primary Examiner* — Marin Pichler
*Assistant Examiner* — Ephrem Z Mebrahtu
(74) *Attorney, Agent, or Firm* — Foley & Lardner LLP

(57) ABSTRACT

An optical device package includes a semiconductor substrate, and an optical device. The semiconductor substrate has a first surface, a second surface different in elevation from the first surface, and a profile connecting the first surface to the second surface. A surface roughness of the profile is greater than a surface roughness of the second surface. The optical device is disposed on the second surface and surrounded by the profile.

19 Claims, 24 Drawing Sheets

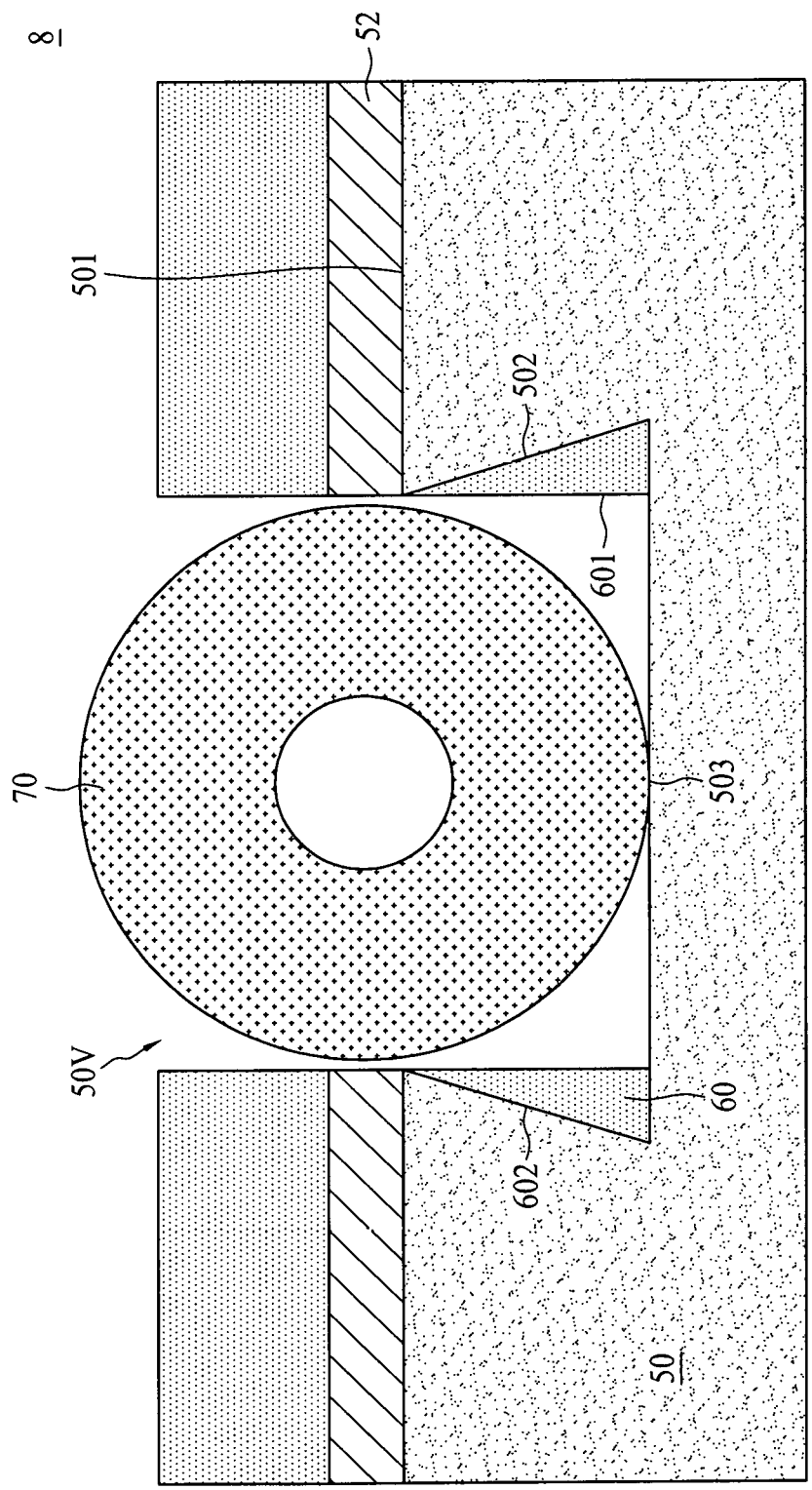

OPTICAL DEVICE PACKAGE AND METHOD FOR MANUFACTURING THE SAME

BACKGROUND

1. Technical Field

The present disclosure relates to an optical device package and manufacturing method thereof, and more particularly, to an optical device package including a groove with a vertical sidewall profile for disposing an optical device and manufacturing method thereof.

2. Description of the Related Art

An optical communication device uses a substrate with V-shaped groove to dispose optical fiber. The V-shaped groove, however, has a larger aperture dimension in the surface of the substrate and larger depth in the substrate. The V-shaped groove occupies a large amount of the substrate, which impedes the trend toward miniaturization of optical communication devices.

SUMMARY

In some embodiments, an optical device package includes a semiconductor substrate and an optical device. The semiconductor substrate has a first surface, a second surface different in elevation from the first surface, and a profile connecting the first surface to the second surface. A surface roughness of the profile is greater than a surface roughness of the second surface. The optical device is disposed on the second surface and surrounded by the profile.

In some embodiments, an optical device package includes a semiconductor substrate, a spacer and an optical device. The semiconductor substrate has a first surface, and a second surface connected to the first surface. The second surface is inclined with respect to the first surface. The spacer is disposed adjacent to the second surface. The spacer has a first edge substantially perpendicular to the first surface of the semiconductor substrate. The optical device is surrounded by the first edge of the spacer.

In some embodiments, a method for manufacturing an optical device package is provided. A semiconductor substrate is received. The semiconductor substrate is patterned to form a trench in the semiconductor substrate. A patterned sacrificial layer is formed over the semiconductor substrate, wherein the patterned sacrificial layer covers a portion of the semiconductor substrate, fills in the trench, and exposes another portion of the semiconductor substrate. The semiconductor substrate exposed from the patterned sacrificial layer is partially removed to form a groove in the semiconductor substrate. The patterned sacrificial layer is removed from the semiconductor substrate.

BRIEF DESCRIPTION OF THE DRAWINGS

Aspects of some embodiments of the present disclosure are best understood from the following detailed description when read with the accompanying figures. Various structures may not be drawn to scale, and the dimensions of the various structures may be arbitrarily increased or reduced for clarity of discussion.

FIG. 3 is a cross-sectional view of an optical device package in accordance with some embodiments of the present disclosure.

DETAILED DESCRIPTION

Figure 1:
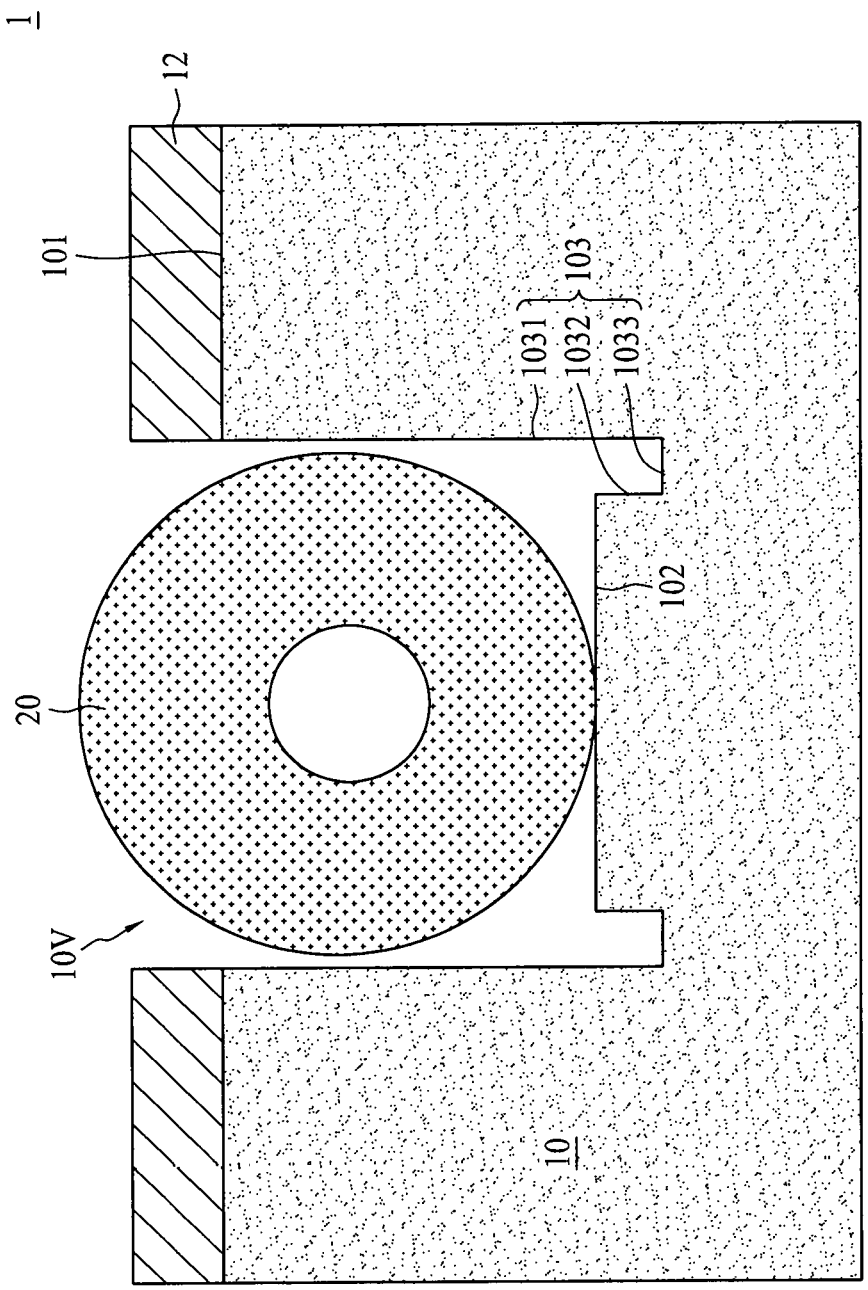
FIG. 1 is a cross-sectional view of an optical device package in accordance with some embodiments of the present disclosure.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features are formed or disposed between the first and second features, such that the first and second features are not in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that such arrangement does not deviate from the merits of the embodiments of this disclosure.

Figure 1A:
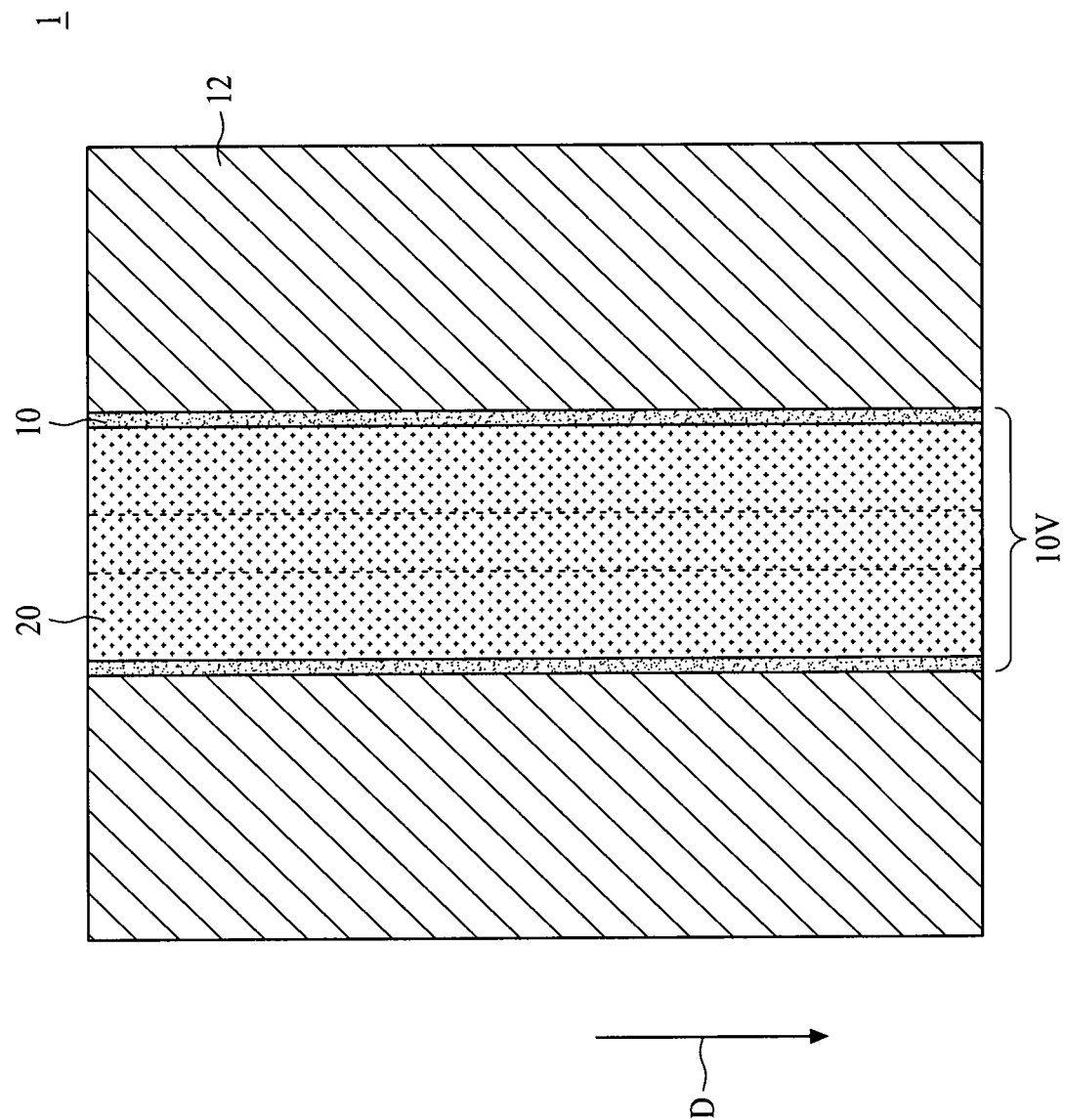
FIG. 1A is a top view of an optical device package in accordance with some embodiments of the present disclosure.

FIG. 1 is a cross-sectional view of an optical device package 1 in accordance with some embodiments of the present disclosure, and FIG. 1A is a top view of an optical device package 1 in accordance with some embodiments of the present disclosure. As shown in FIG. 1 and FIG. 1A, the optical device package 1 includes a semiconductor substrate 10, and an optical device 20. The semiconductor substrate 10 may include a silicon substrate, or a substrate made from another semiconductive material. The semiconductor substrate 10 has a first surface 101, a second surface 102 different in elevation from the first surface 101, and a profile 103 connecting the first surface 101 to the second surface 102. In some embodiments, the second surface 102 is lower than the first surface 101, and the first surface 101, the second surface 102 and the profile 103 collectively form a groove 10V for disposing the optical device 20. In some embodiments, the first surface 101 and the second surface 102 may be substantially parallel to each other. In some embodiments, a protection layer 12 can be disposed on the first surface 101. The protection layer 12 may be configured as a mask layer such as a hard mask layer to protect the semiconductor substrate 10. The material of the protection layer 12 may include silicon oxide, silicon nitride, or other suitable inorganic and/or organic materials.

As shown in FIG. 1, the profile 103 of the semiconductor substrate 10 may include a first side surface 1031, a second side surface 1032 and a third surface 1033. The first side surface 1031 is connected to the first surface 101. The second side surface 1032 is connected to the second surface 102. The third surface 1033 is disposed between and connected to the first side surface 1031 and the second side surface 1032. In some embodiments, the second surface 102 is higher than the third surface 1033. The third surface 1033 may be substantially parallel to the second surface 102. The first side surface 1031 and the second side surface 1032 may be substantially perpendicular to the third surface 1033.

The optical device 20 is disposed on the second surface 102 and surrounded by the profile 103. In some embodiments, the optical device 20 may include a tubular optical device having a curved outer surface, and extending along a direction D as shown in FIG. 1A. For example, the optical device 20 may include an optical fiber or the like. In some embodiments, the optical device 20 is in contact with the second surface 102 of the semiconductor substrate 10. In some embodiments, the optical device 20 may be partially or entirely surrounded by the profile 103, depending on the height of the optical device 20. In some embodiments, the optical device 20 is in contact with the profile 103 of the semiconductor substrate 10. For example, the optical device 20 may be in contact with the first side surface 1031 of the profile 103. In some embodiments, the first side surface 1031 may be substantially vertical with respect to the first surface 101 of the semiconductor substrate 10. In some embodiments, the included angle between the first side surface 1031 and the first surface 101 of the semiconductor substrate 10 substantially ranges from about 88° to about 92°, for example, about 90°. With the vertical first side surface 1031, the dimension of the groove 10V proximal to the first surface 101 and the dimension of the groove 10V proximal to the second surface 102 are substantially the same. Accordingly, the overall space of the groove 10V can be reduced, which facilitates miniaturization of the optical device package 1. In addition, the optical device 20 can be securely fastened in the groove 10V.

Figure 2A:
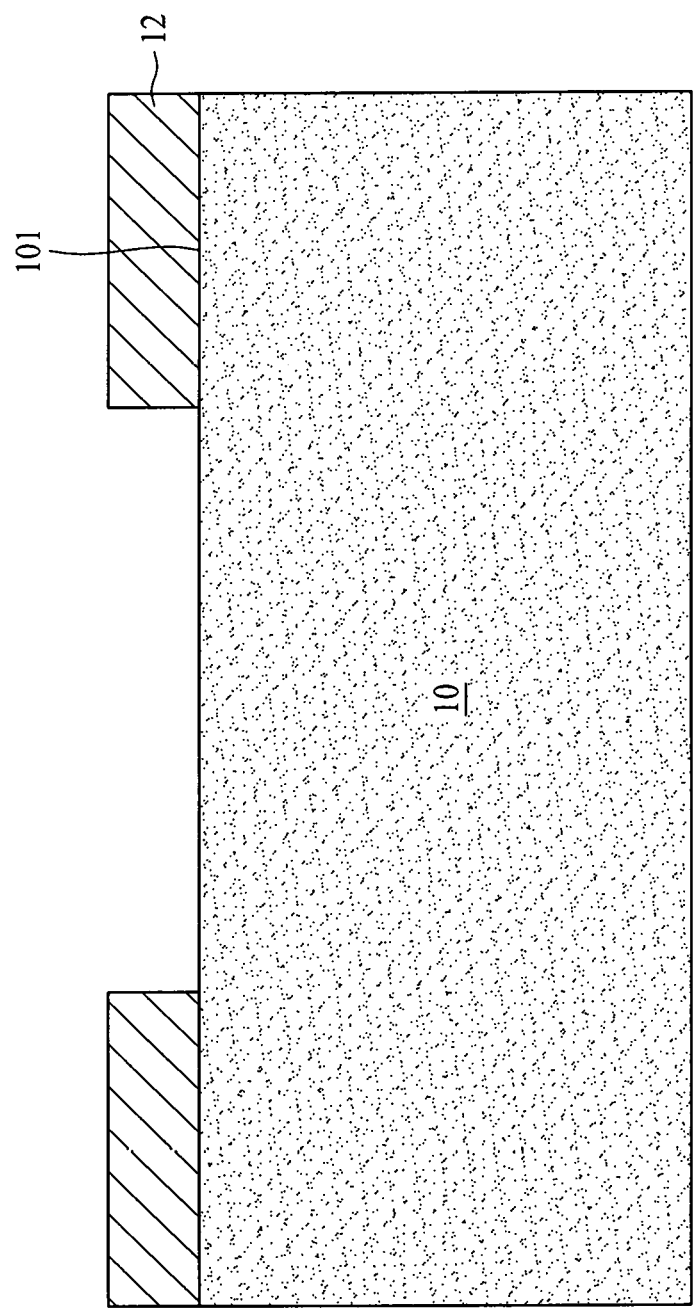
FIG. 2A, FIG. 2B, FIG. 2C, FIG. 2D and FIG. 2E are schematic diagrams illustrating a method of fabricating an optical device package in accordance with some embodiments of the present disclosure.
Figure 2B:
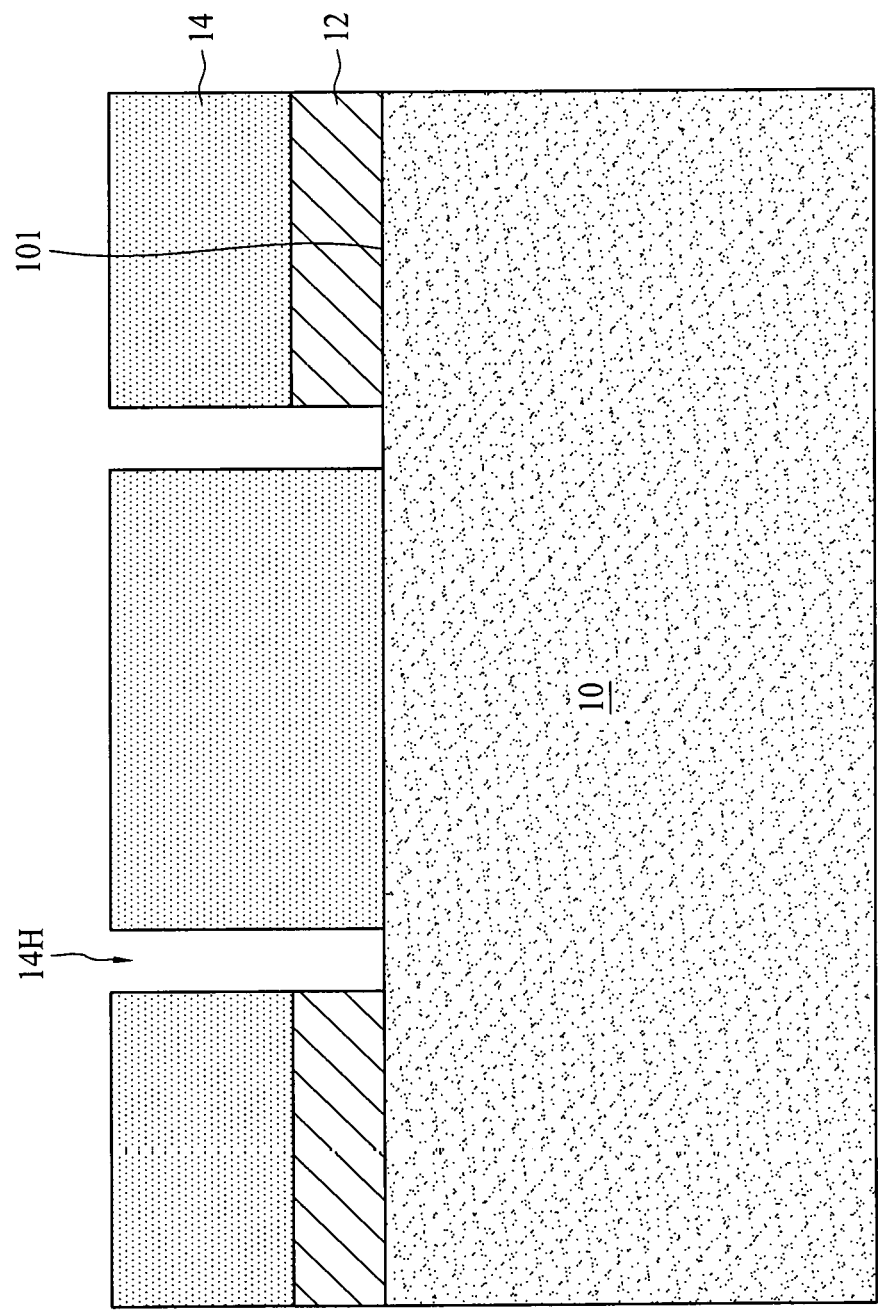

FIG. 2A, FIG. 2B, FIG. 2C, FIG. 2D and FIG. 2E are schematic diagrams illustrating a method of fabricating an optical device package in accordance with some embodiments of the present disclosure. As shown in FIG. 2A, a semiconductor substrate 10 is received. In some embodiments, a protection layer 12 is formed on a first surface 101 of the semiconductor substrate 10. The protection layer 12 may be configured as a hard mask layer, partially covering the first surface 101. As shown in FIG. 2B, a patterned sacrificial layer 14 such as a photoresist layer is formed over the semiconductor substrate 10. The patterned sacrificial layer 14 includes openings 14H exposing a portion of the first surface 101.

Figure 2C:
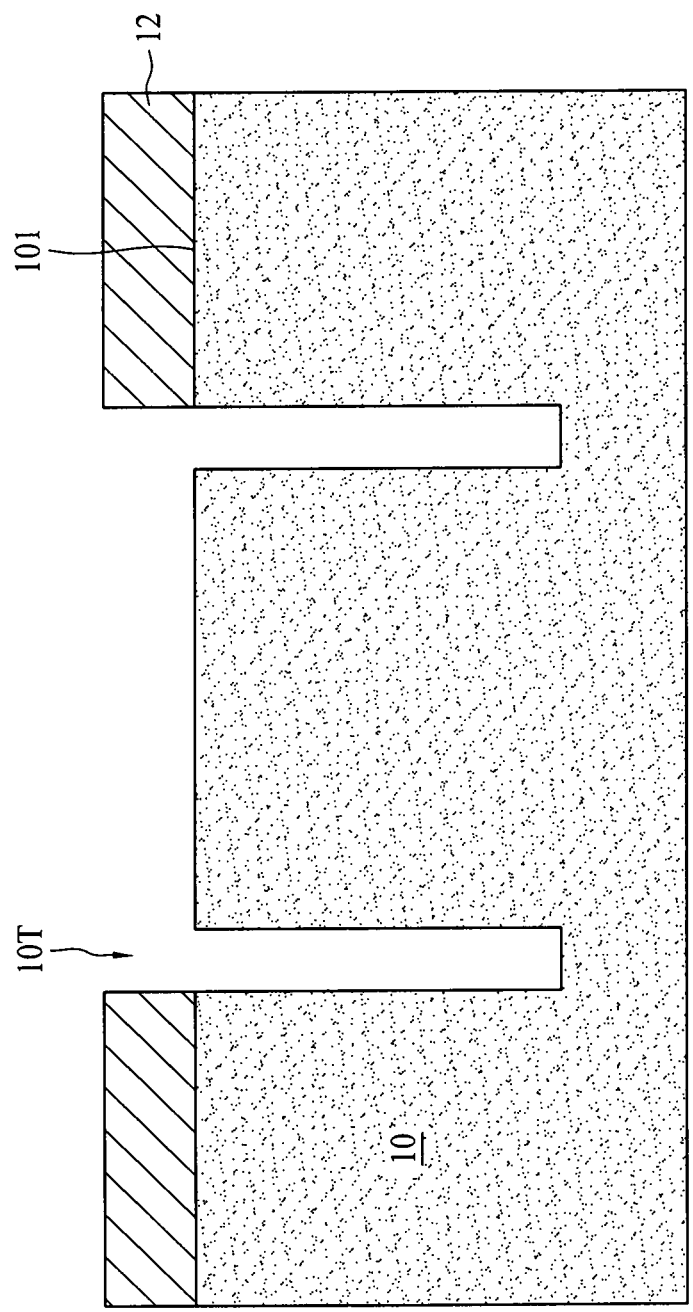

As shown in FIG. 2C, the semiconductor substrate 10 is patterned to form trenches 10T in the semiconductor substrate 10. In some embodiments, the semiconductor substrate 10 is patterned through the openings 14H of the patterned sacrificial layer 14 by an anisotropic etching such as dry etching. For example, the dry etching may include plasma etching or the like. The anisotropic etching is selected to form the trenches 10T such that the verticality of the sidewall of trench 10T can be maintained, particularly when the depth of the trench 10T is larger. In some embodiments, the depth of the trench 10T is greater than 200 micrometers (um) such as 250 um. In some embodiments, the included angle between the sidewall of the trench 10T and the first surface 101 of the semiconductor substrate 10 substantially ranges from about 88° to about 92°, for example, about 90°. In some embodiments, the bottom and the sidewalls of the trench 10T have rough surfaces when the trench 10T is formed by anisotropic etching. In some embodiments, the patterned sacrificial layer 14 is removed from the semiconductor substrate 10 after the trench 10T is formed.

Figure 2D:
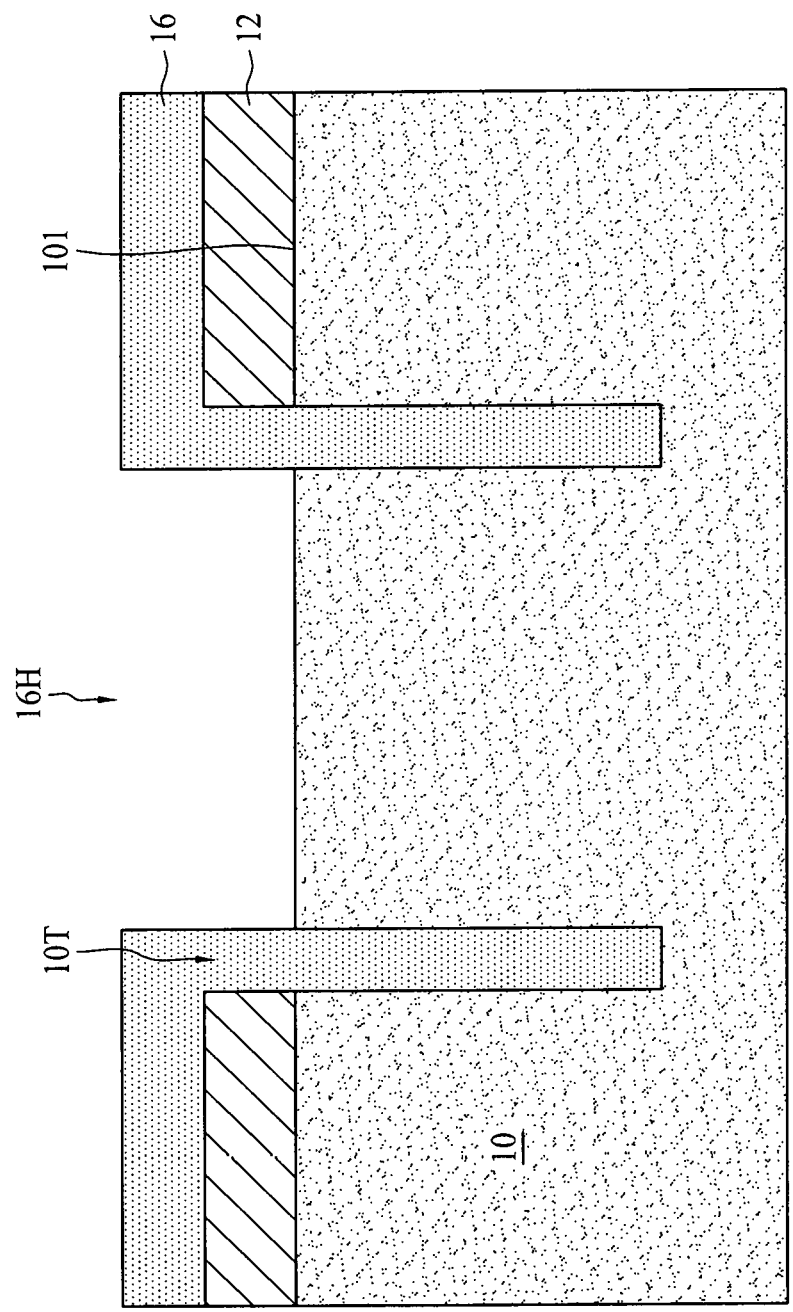

As shown in FIG. 2D, another patterned sacrificial layer 16 such as a photoresist layer is formed over the semiconductor substrate 10. The patterned sacrificial layer 16 may cover a portion of the semiconductor substrate 10 and fill in the trench 10T. The patterned sacrificial layer 16 includes openings 16H exposing another portion of the semiconductor substrate 10, for example the portion of the semiconductor substrate 10 between the trenches 10T.

Figure 2E:
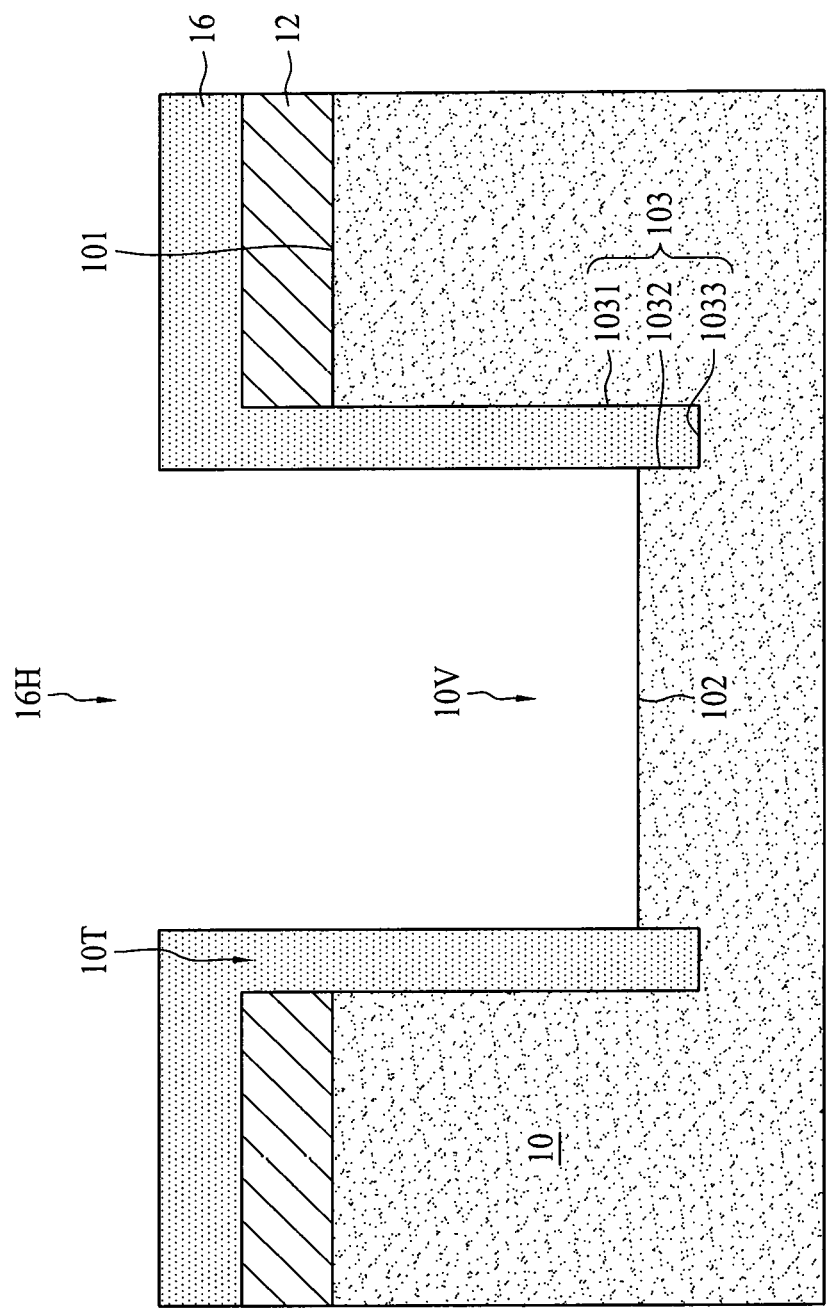

As shown in FIG. 2E, the semiconductor substrate 10 exposed from the patterned sacrificial layer 16 is partially removed to form a groove 10V in the semiconductor substrate 10. In some embodiments, the semiconductor substrate 10 is partially removed through the openings 16H of the patterned sacrificial layer 16 by an isotropic etching such as wet etching. The isotropic etching is selected to form the groove 10V, so as to remove defects and residues at the bottom of the groove 10V. During formation of the groove 10V, the sidewall of the trench 10T is covered and protected by the patterned sacrificial layer 16. Accordingly, the verticality of the sidewalls of the trench 10T can be maintained without being damaged by the etchant of the isotropic etching. Compared to the bottom and sidewall of the trench 10T formed by anisotropic etching, the surface of the bottom of the groove 10V formed by isotropic etching is flatter, and thus the uniformity of the groove 10V can be increased.

As shown in FIG. 1 and FIG. 1A, the patterned sacrificial layer 16 is removed from the semiconductor substrate 10. After the patterned sacrificial layer 16 is removed, the semiconductor substrate 10 has a first surface 101, a second surface 102 lower in elevation than the first surface 101, and a profile 103 connecting the first surface 101 to the second surface 102. The profile 103 includes a first side surface 1031, a second side surface 1032 and a third surface 1033. The first side surface 1031 is connected to the first surface 101. The second side surface 1032 is connected to the second surface 102. The third surface 1033 is disposed between and connected to the first side surface 1031 and the second side surface 1032. The third surface 1033 is lower than the second surface 102. The third surface 1033 may be substantially parallel to the second surface 102. The first side surface 1031 and the second side surface 1032 may be substantially perpendicular to the third surface 1033. An optical device 20 is disposed in the groove 10V to form the optical device package 1 as illustrated in FIG. 1 and FIG. 1A.

The groove 10V may be formed by multi-stage etching to improve the verticality of the sidewall of the groove 10V (first side surface 1031), and to improve the uniformity of the bottom of the groove 10V (second surface 102).

Optical device packages provided by the present disclosure are not limited to the above-described embodiments, and may include other, different embodiments, such as those described below. To simplify the description and for convenient comparison between each of the embodiments of the present disclosure, the same or similar components in each of the following embodiments are marked with the same numerals and are not redundantly described.

Figure 1B:
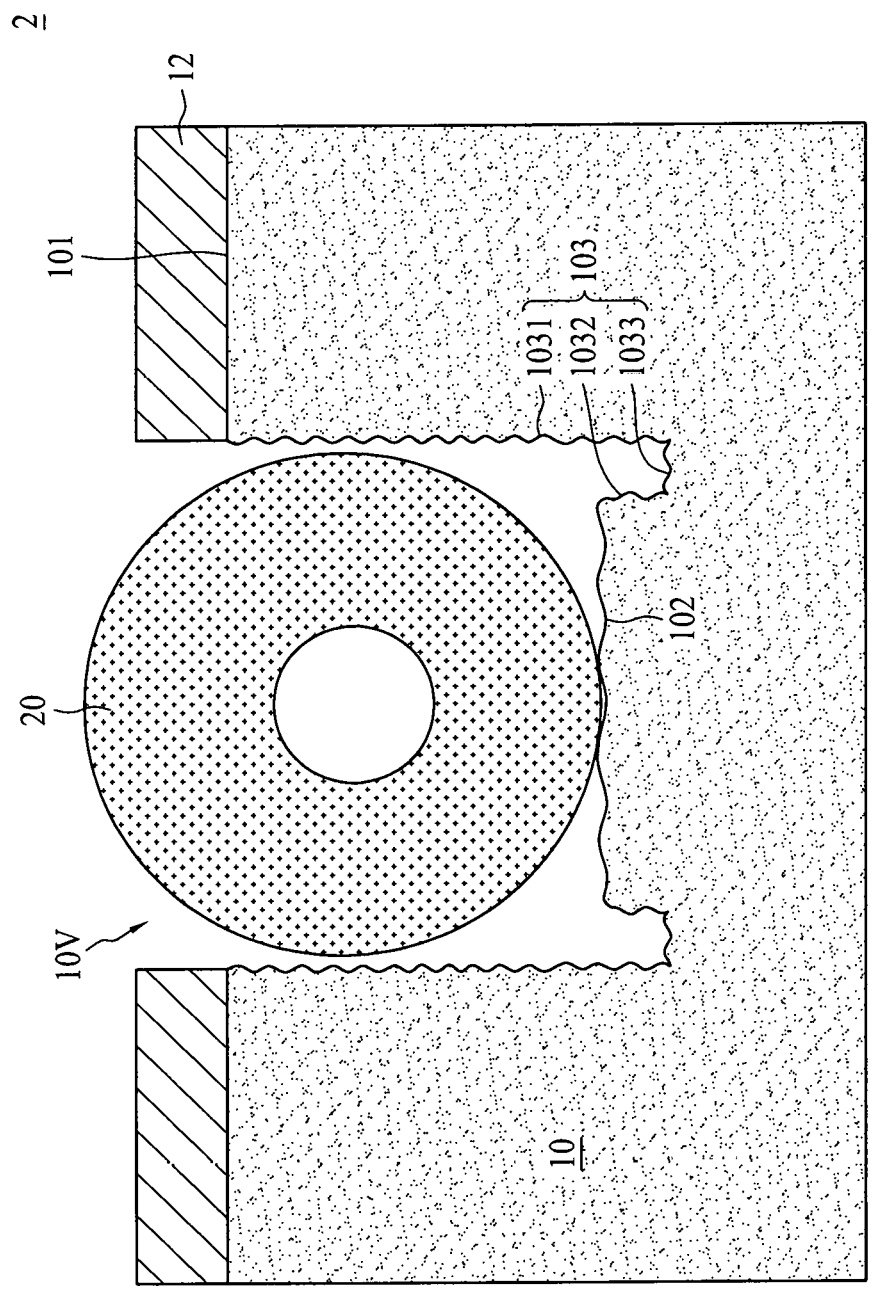
FIG. 1B, FIG. 1C, FIG. 1D, FIG. 1E, FIG. 1F and FIG. 1G are schematic diagrams illustrating optical device packages in accordance with some other embodiments of the present disclosure.

FIG. 1B, FIG. 1C, FIG. 1D, FIG. 1E, FIG. 1F and FIG. 1G are schematic diagrams illustrating optical device packages 2, 3, 4, 5, 6 and 7 in accordance with some other embodiments of the present disclosure. As shown in FIG. 1B, in comparison to the optical device package 1 of FIG. 1, the second surface 102 and the profile 103 of the groove 10V of the optical device package 2 are rough. In some embodiments, the profile 103 and the second surface 102 are formed by different etching processes as previously described, and thus may have different roughness. In some embodiments, the surface roughness of the profile 103 is greater than the surface roughness of the second surface 102. For example, a ratio of the surface roughness of the profile 103 to the surface roughness of the second surface 102 may substantially range from about 10 to about 40. The surface roughness may be measured in terms of arithmetic mean roughness. For example, the arithmetic mean roughness Ra of the profile 103 may substantially range from about 100 nanometers (nm) to about 200 nm, and the arithmetic mean roughness Ra of the second surface 102 may substantially range from about 5 nm to about 10 nm.

Figure 1C:
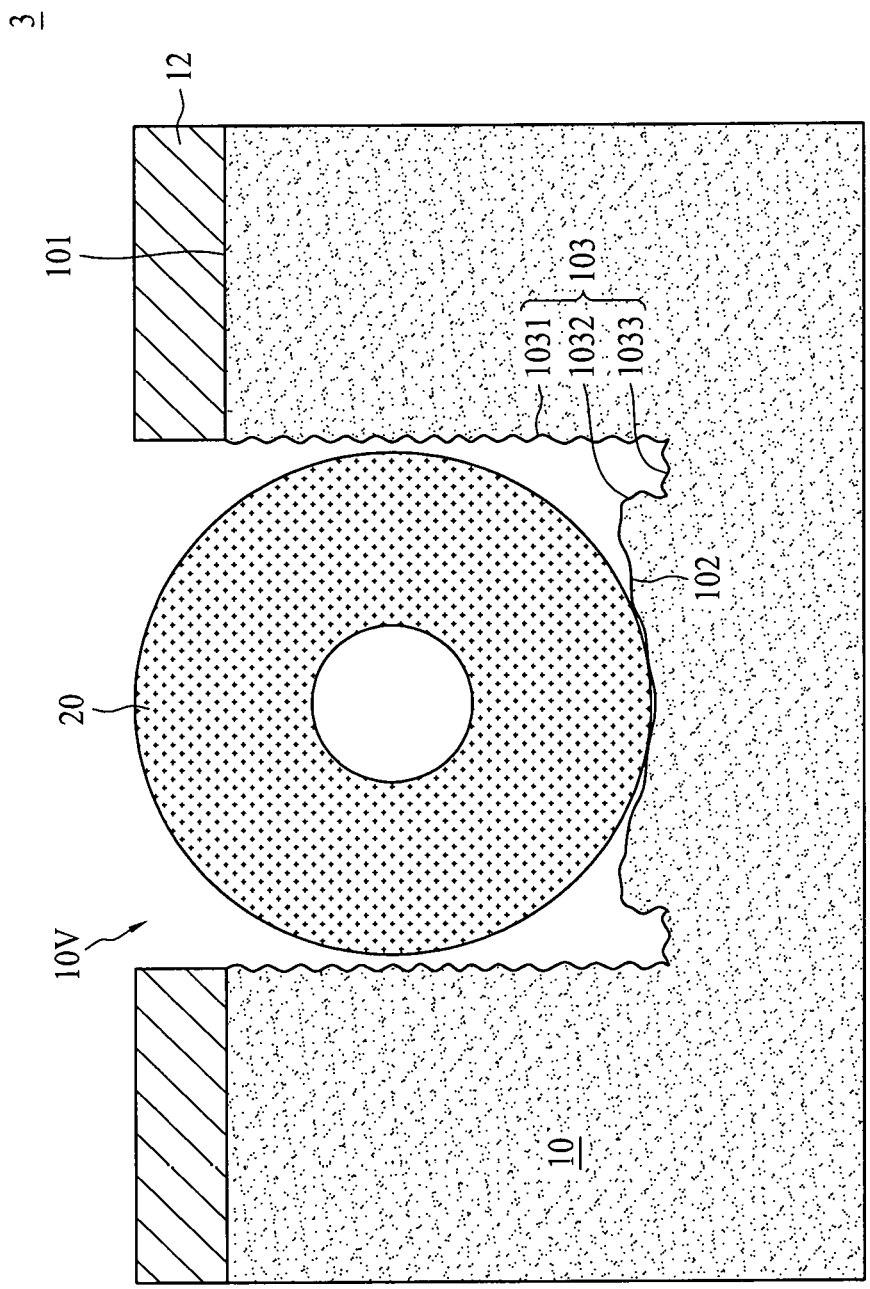

As shown in FIG. 1C, in comparison to the optical device package 2 of FIG. 1B, the second surface 102 of the groove 10V of the optical device package 3 may be recessed and curved. The recessed and curved second surface 102 may fit in the contour of the optical device 20, and thus the optical device 20 can be securely fastened in the groove 10V.

Figure 1D:
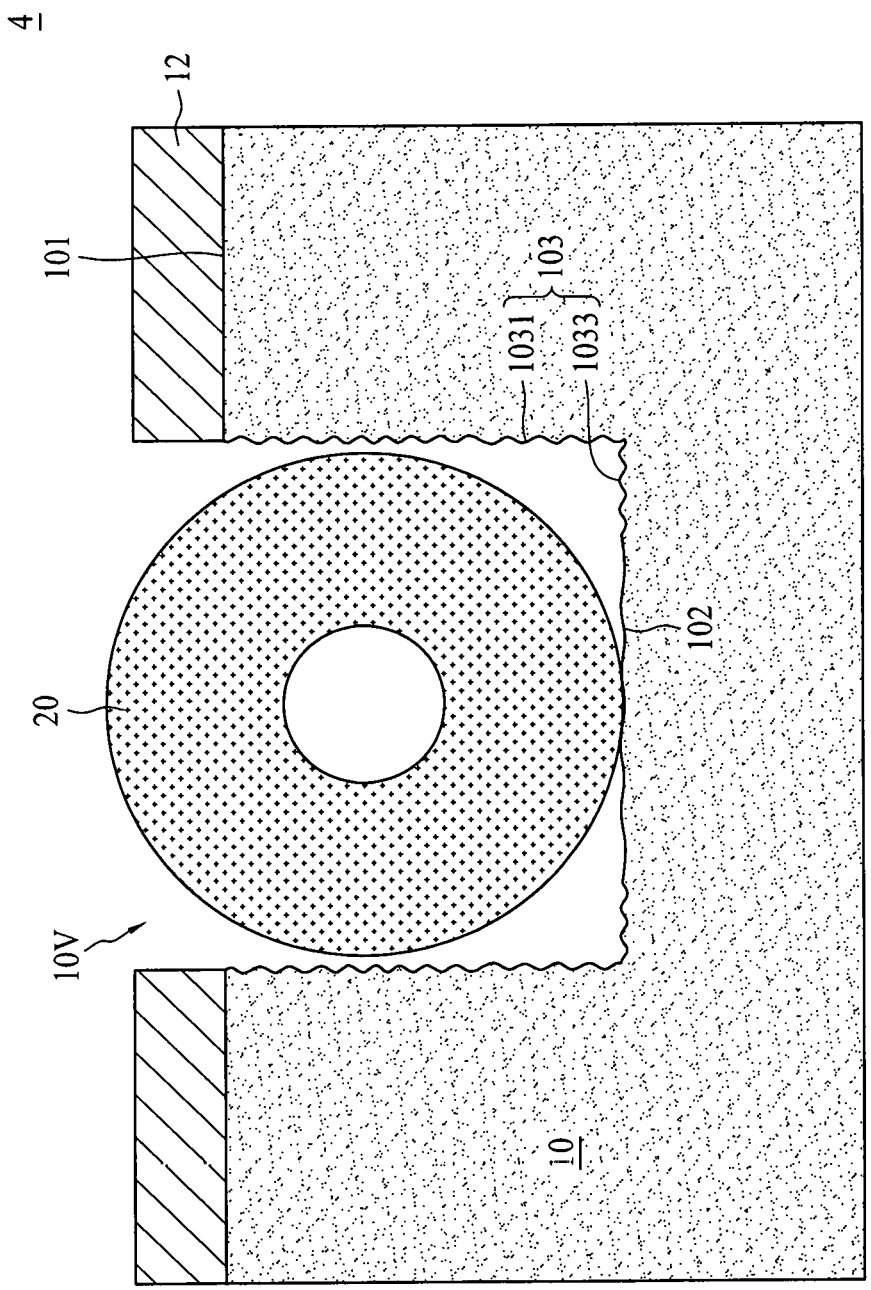

As shown in FIG. 1D, in comparison to the optical device package 2 of FIG. 1B, the groove 10V of the optical device package 4 is deeper, and the second surface 102 may be substantially level with the third surface 1033 of the profile 103.

Figure 1E:
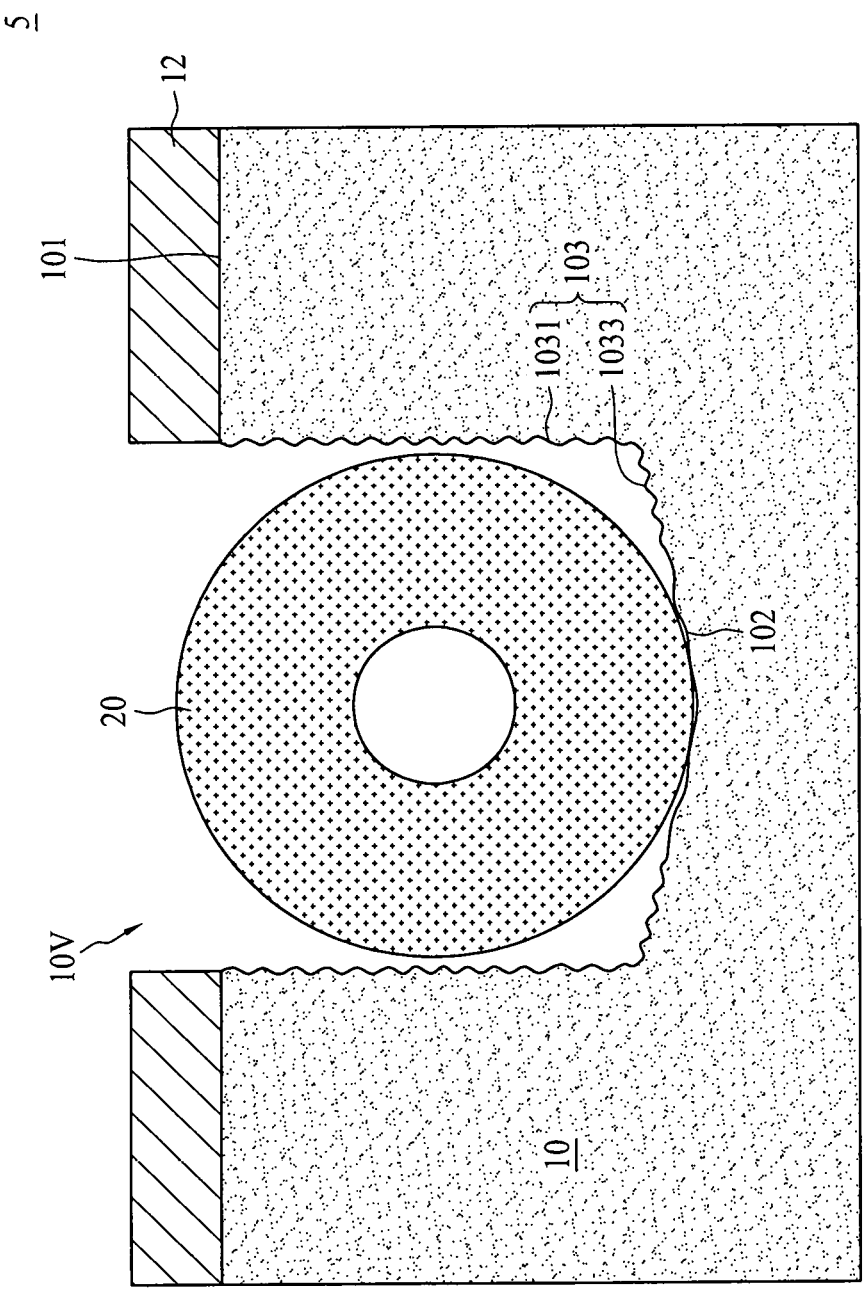

As shown in FIG. 1E, in comparison to the optical device package 4 of FIG. 1D, the second surface 102 of the groove 10V of the optical device package 5 may be recessed and curved. The recessed and curved second surface 102 may fit in the contour of the optical device 20, and thus the optical device 20 can be securely fastened in the groove 10V.

Figure 1F:
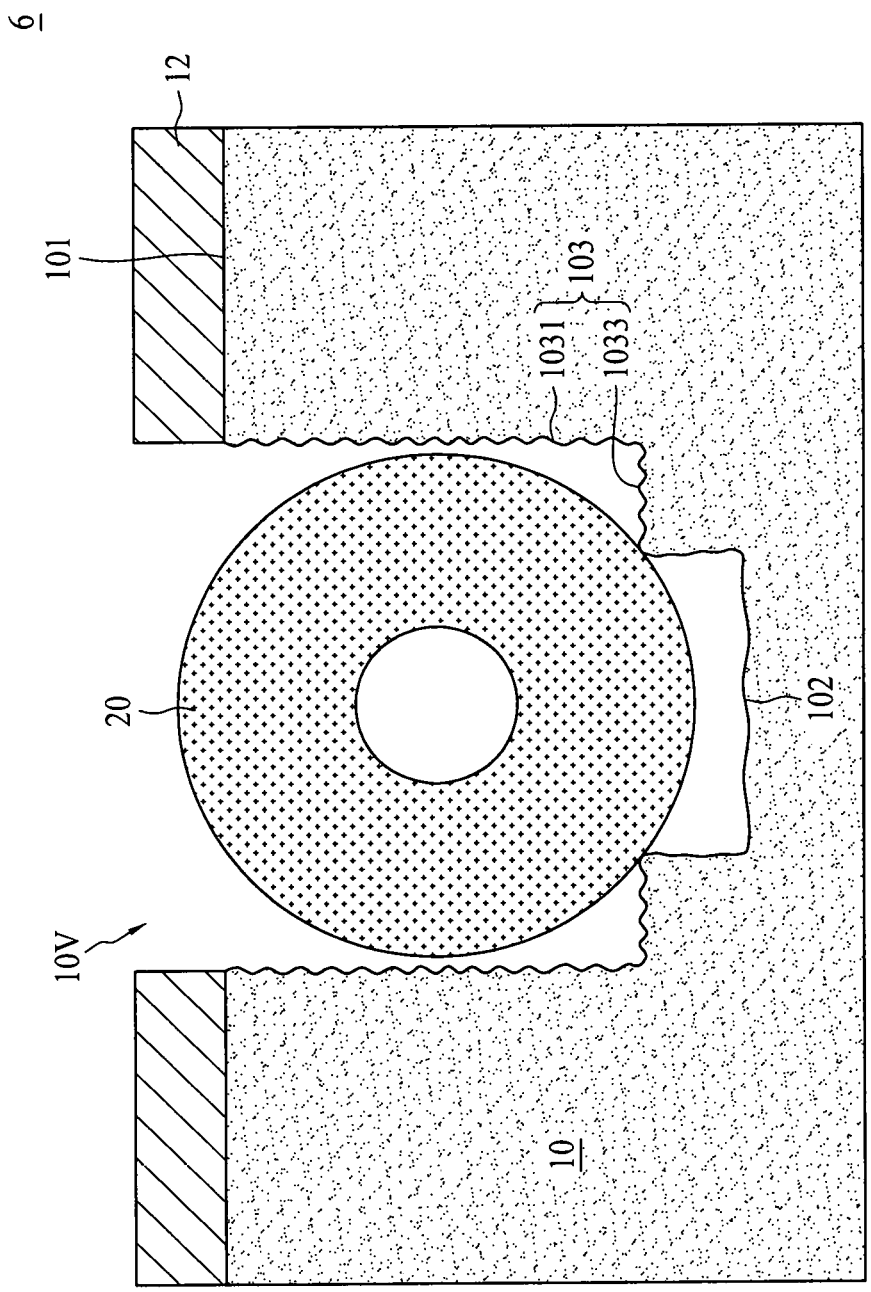

As shown in FIG. 1F, in comparison to the optical device package 4 of FIG. 1D, the second surface 102 of the groove 10V of the optical device package 6 is lower than the third surface 1033 of the profile 103.

Figure 1G:
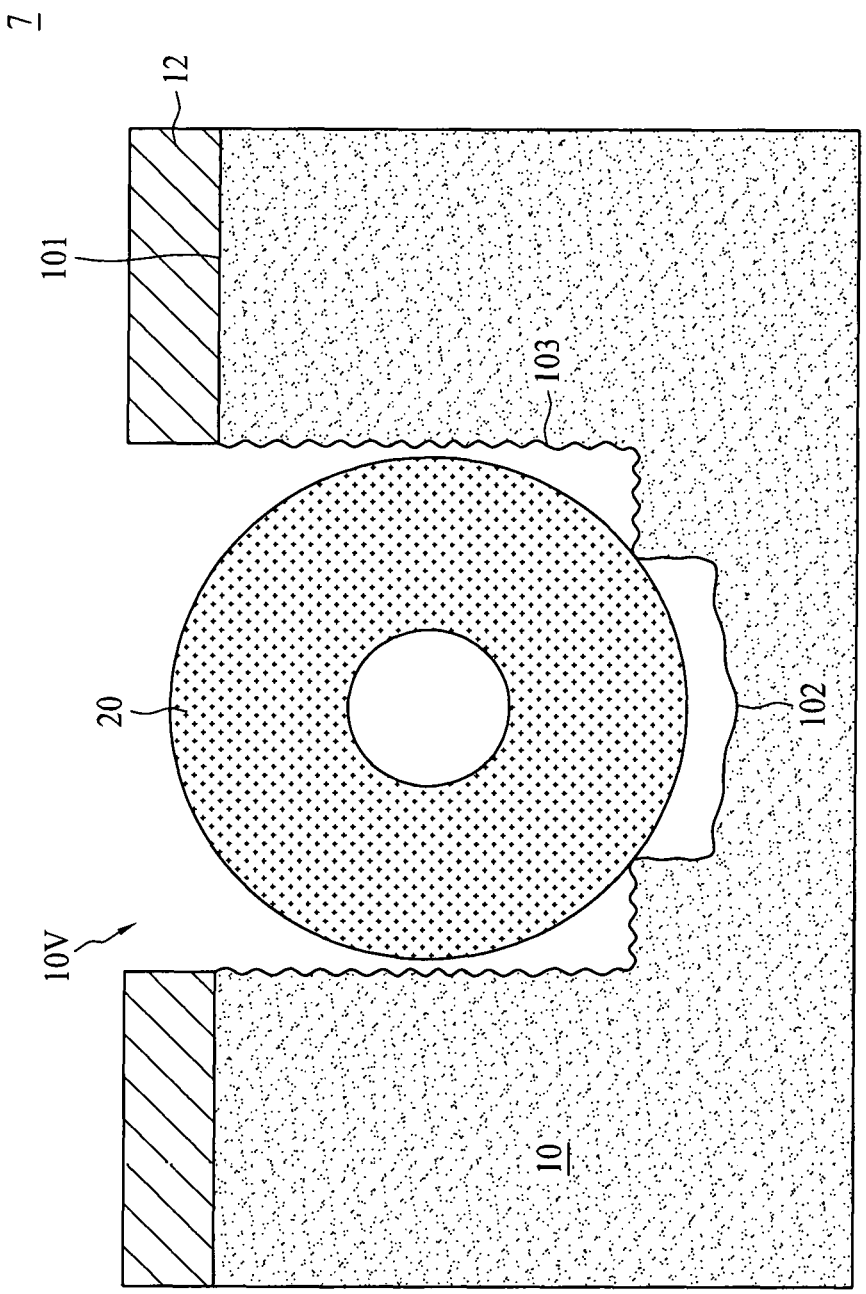

As shown in FIG. 1G, in comparison to the optical device package 6 of FIG. 1F, the second surface 102 of the groove 10V of the optical device package 7 may be recessed and curved. The recessed and curved second surface 102 may fit in the contour of the optical device 20, and thus the optical device 20 can be securely fastened in the groove 10V.

FIG. 3 is a cross-sectional view of an optical device package 8 in accordance with some embodiments of the present disclosure. As shown in FIG. 3, the optical device package 8 includes a semiconductor substrate 50, a spacer 60 and an optical device 70. The semiconductor substrate 50 may include a silicon substrate, or a substrate made from another semiconductive material. The semiconductor substrate 50 has a first surface 501 and a second surface 502 connected to the first surface 501. The second surface 502 is inclined with respect to the first surface 501. In some embodiments, the second surface 502 is inclined inwardly with respect to the first surface 501. The semiconductor substrate 50 may further include a third surface 503 lower than the first surface 501 and connected to the second surface 502.

In some embodiments, a protection layer 52 can be disposed on the first surface 501. The protection layer 52 may be configured to protect the semiconductor substrate 10. The material of the protection layer 52 may include silicon oxide, silicon nitride, or other suitable inorganic and/or organic materials.

The spacer 60 is disposed adjacent to the second surface 502. The spacer 60 has a first edge 601 substantially perpendicular to the first surface 501 of the semiconductor substrate 50. In some embodiments, the spacer 60 has a second edge 602 in contact with the second surface 502 of the semiconductor substrate 50. In some embodiments, the material of the spacer 60 may include a photosensitive material, which can be patterned by exposure and development. For example, the material of the spacer 60 may include photoresist material or the like. In some embodiments, the first surface 501, the third surface 503 and the first edge 601 of the spacer 601 collectively form a groove 50V for disposing the optical device 70.

The optical device 70 is surrounded by the first edge 601 of the spacer 60. In some embodiments, the optical device 70 may include a tubular optical device having a curved outer surface. For example, the optical device 70 may include an optical fiber or the like. In some embodiments, the optical device 70 is in contact with the first edge 601. In some embodiments, the optical device 20 may be partially or entirely surrounded by the first edge 601, depending on the height of the optical device 70. The optical device 70 may be disposed on and supported by the third surface 503 of the semiconductor substrate 50. The first edge 601 of the spacer 60 may be substantially vertical with respect to the first surface 501 of the semiconductor substrate 50. With the vertical first edge 601, the optical device 70 can be securely fastened in the groove 50V, and miniaturization of the optical device package 8 can be realized.

Figure 4A:
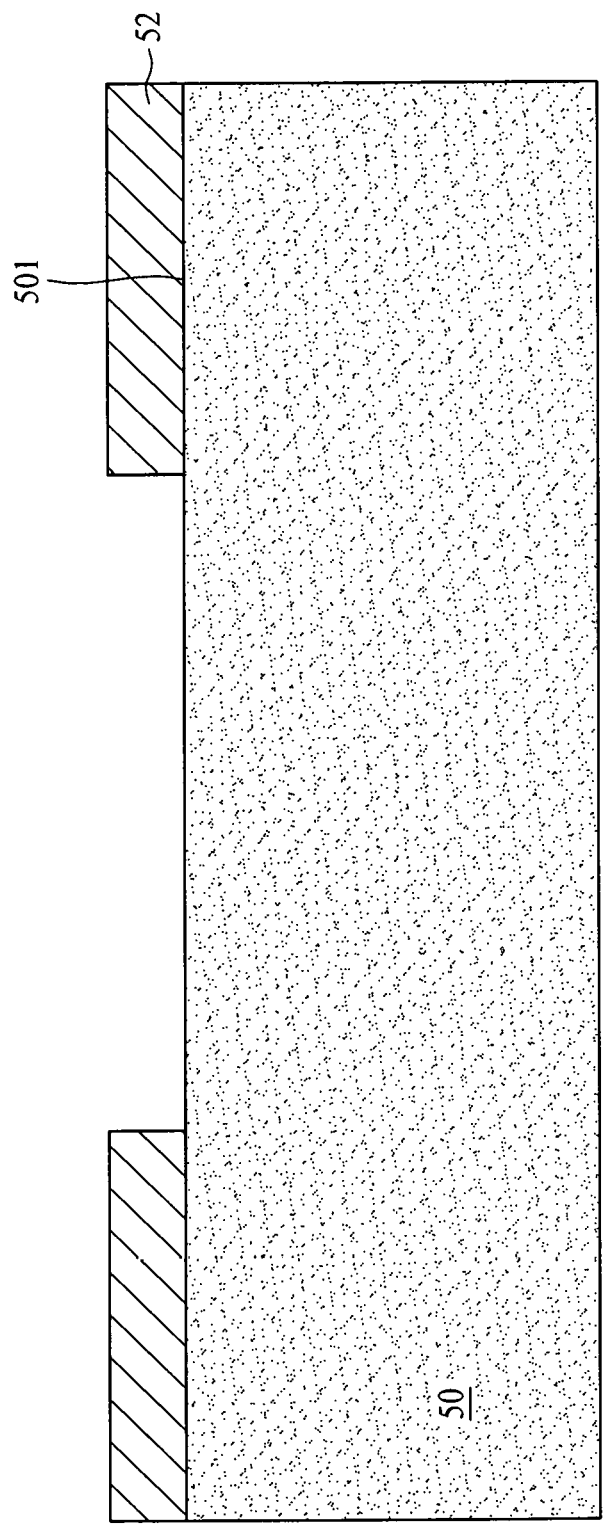
FIG. 4A, FIG. 4B, FIG. 4C and FIG. 4D are schematic diagrams illustrating a method of fabricating an optical device package in accordance with some embodiments of the present disclosure.
Figure 4B:
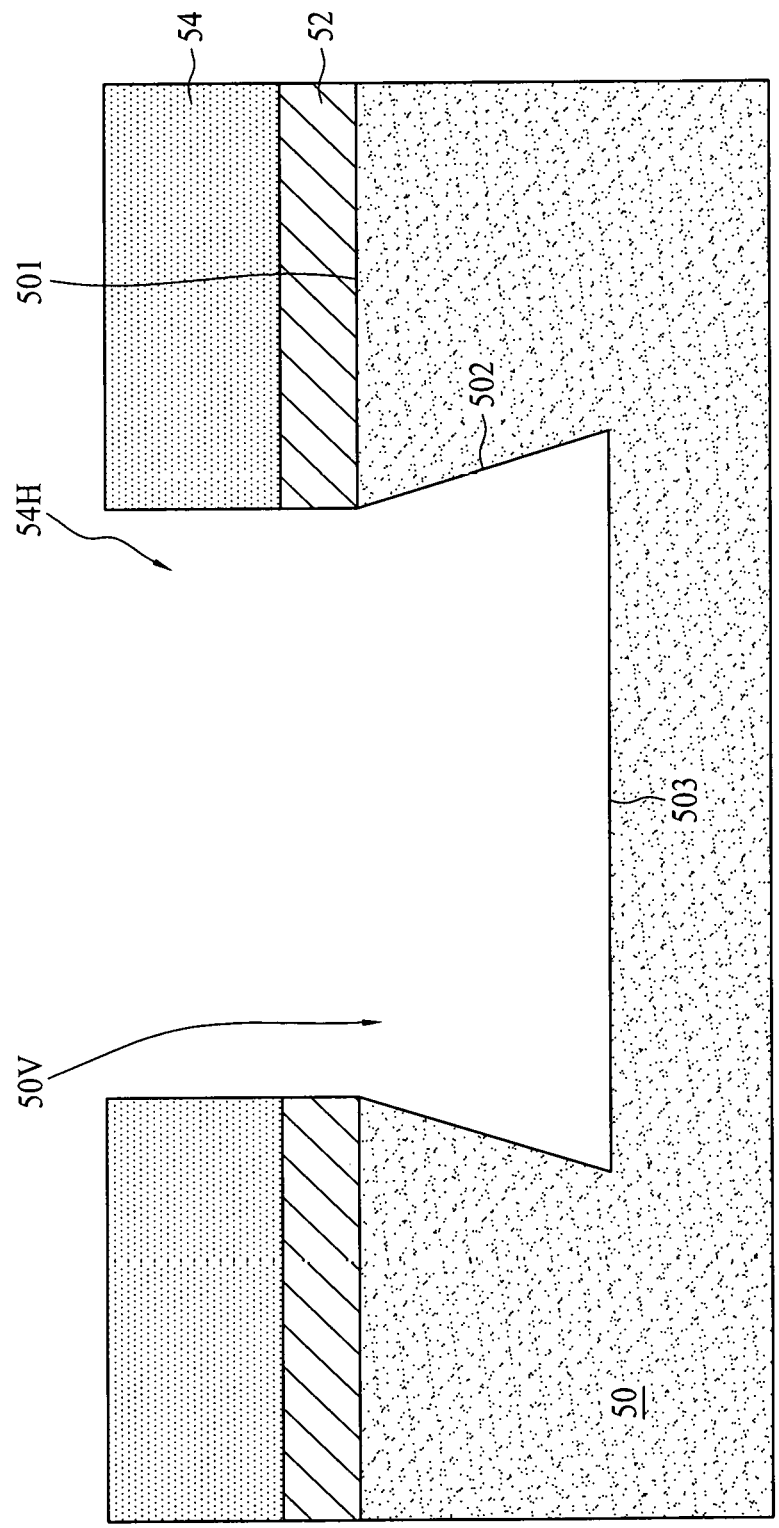

FIG. 4A, FIG. 4B, FIG. 4C and FIG. 4D are schematic diagrams illustrating a method of fabricating an optical device package in accordance with some embodiments of the present disclosure. As shown in FIG. 4A, a semiconductor substrate 50 is received. In some embodiments, a protection layer 52 is formed on a first surface 501 of the semiconductor substrate 50. The protection layer 52 may be configured as a hard mask layer, partially covering the first surface 501. As shown in FIG. 4B, a patterned sacrificial layer 54 such as a photoresist layer is formed over the semiconductor substrate 50. The patterned sacrificial layer 54 includes openings 54H exposing a portion of the first surface 501. The semiconductor substrate 50 is patterned to form a groove 50V in the semiconductor substrate 50. In some embodiments, the semiconductor substrate 50 is patterned through the openings 54H of the patterned sacrificial layer 54 by an isotropic etching such as wet etching. The etching of the semiconductor substrate 50 is controlled such that the second surface 502 is inclined inwardly with respect to the first surface 501. In some embodiments, the groove 50V may have a trapezoidal cross-sectional shape.

Figure 4C:
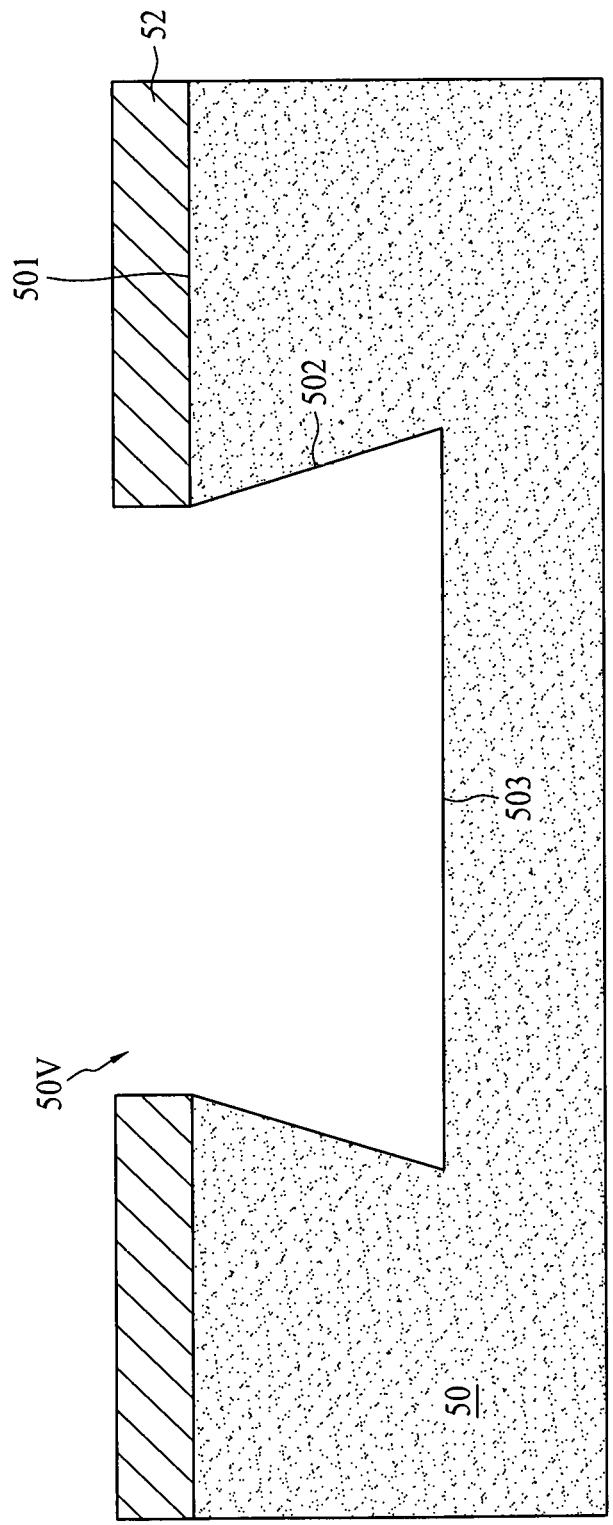
Figure 4D:
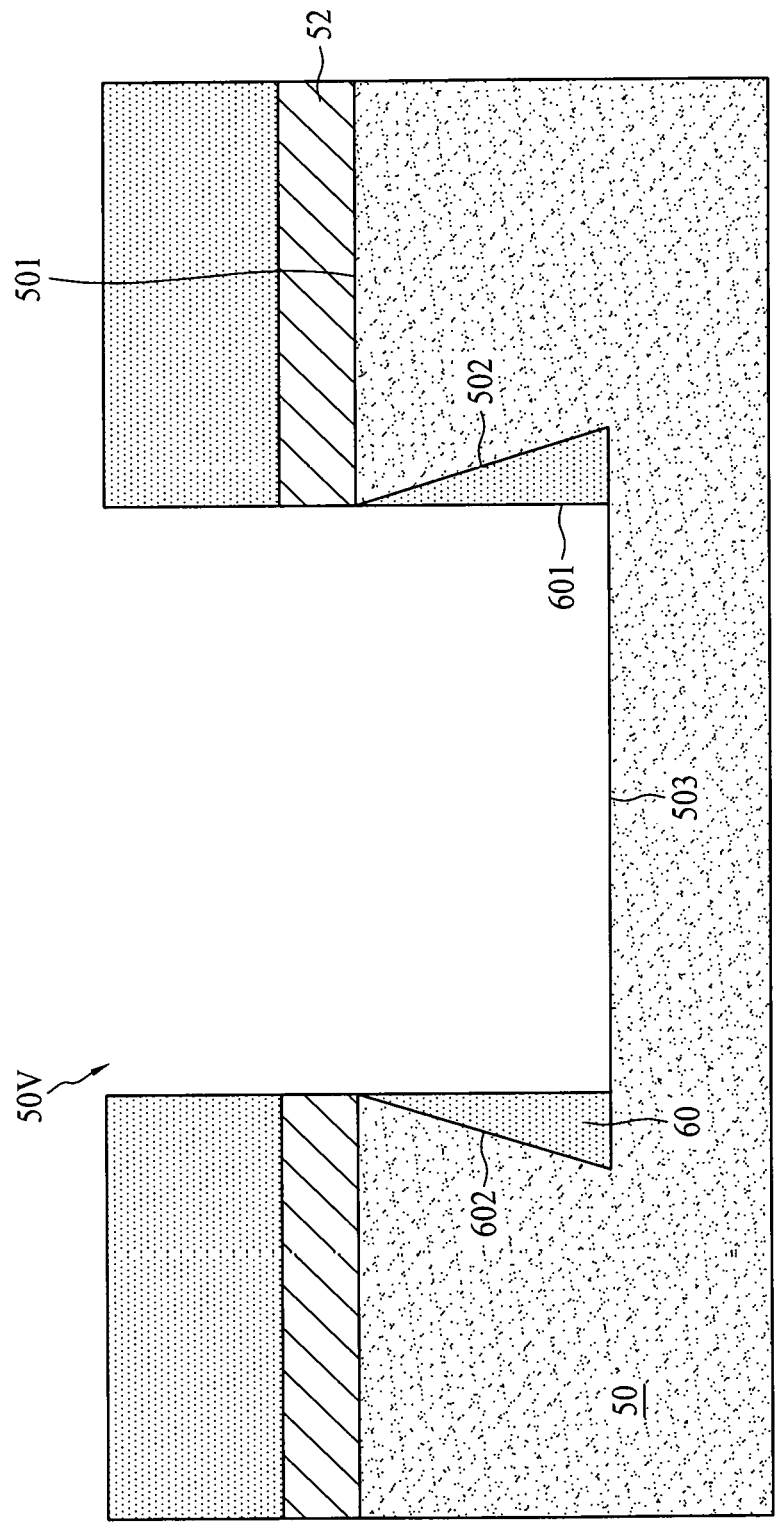

As shown in FIG. 4C, the patterned sacrificial layer 54 is removed from the semiconductor substrate 50 after the groove 50V is formed. As shown in FIG. 4D, a spacer 60 is formed over the semiconductor substrate 50 and in the groove 50V. In some embodiments, the spacer 60 is formed by coating a photosensitive material such as photoresist. The photosensitive material may be patterned by exposure and development to form the spacer 60. The spacer 60 has a first edge 601 substantially perpendicular to the first surface 501 of the semiconductor substrate 50, and a second edge 602 in contact with the second surface 502 of the semiconductor substrate 50.

The optical device 70 is disposed in the groove 50V of the semiconductor substrate 50 to form the optical device package 8 as shown in FIG. 3. By virtue of the spacer 60 with the vertical first edge 601, the verticality of the sidewalls of the groove 50V can be maintained. Accordingly, the overall space of the groove 50V can be reduced, which facilitates miniaturization of the optical device package 8. In addition, the optical device 70 can be securely fastened in the groove 50V.

Figure 5:
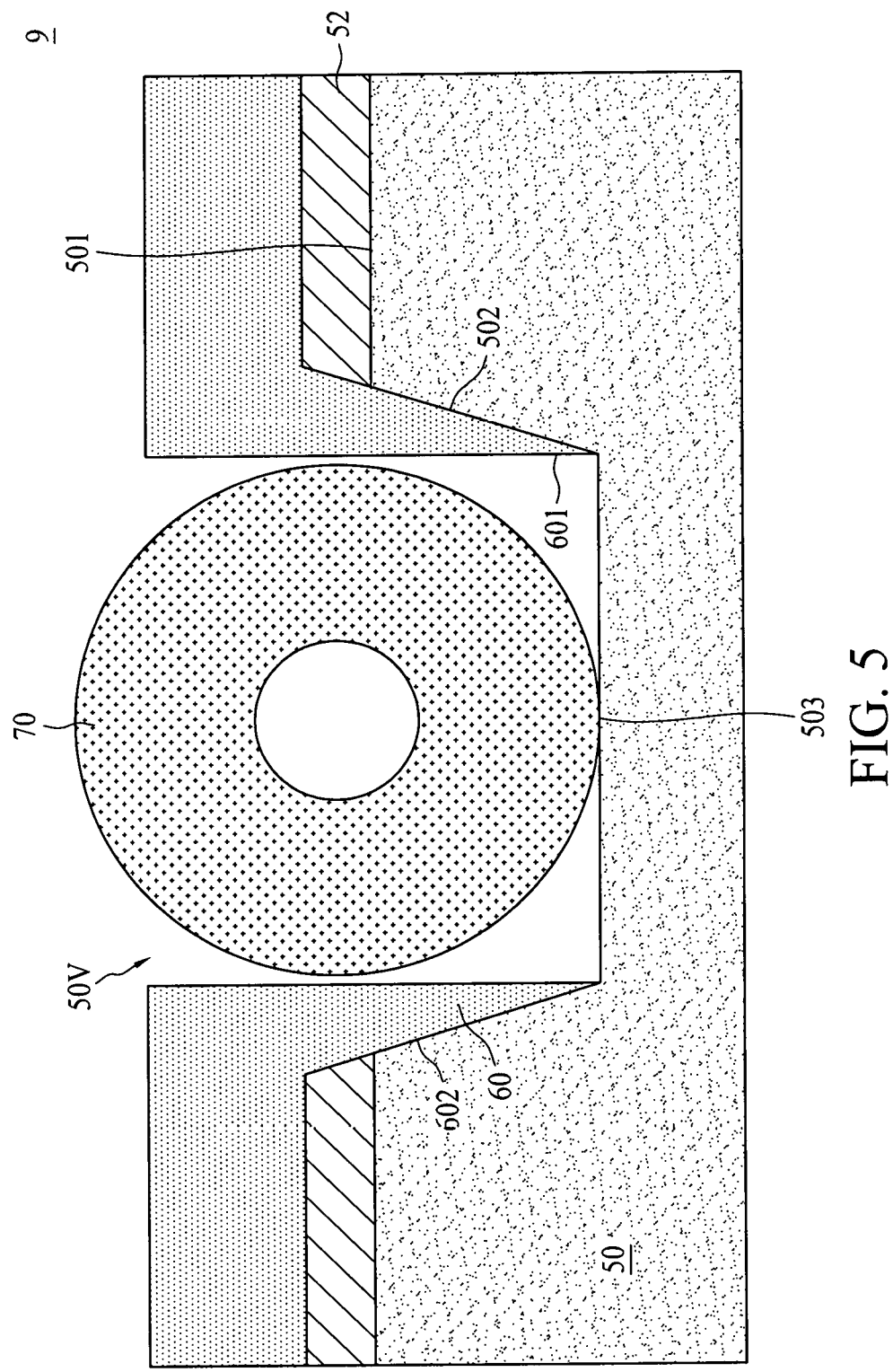
FIG. 5 is a schematic diagram illustrating an optical device package in accordance with some other embodiments of the present disclosure.

FIG. 5 is a schematic diagram illustrating an optical device package 9 in accordance with some other embodiments of the present disclosure. In comparison to the optical device package 8 of FIG. 4, the second surface 502 is inclined outwardly with respect to the first surface 501. The first edge 601 of the spacer 60 is substantially perpendicular to the first surface 501 of the semiconductor substrate 50, while the second edge 602 of the spacer 60 is in contact with the second surface 502 of the semiconductor substrate 50. In some other embodiments, the groove 50V may be formed by laser drilling, mechanical drilling or other suitable processes. In some embodiments, the groove 50V of the semiconductor substrate 50 can be formed by etching. In some embodiments, the groove 50V may have an inverted trapezoidal cross-sectional shape.

Figure 6:
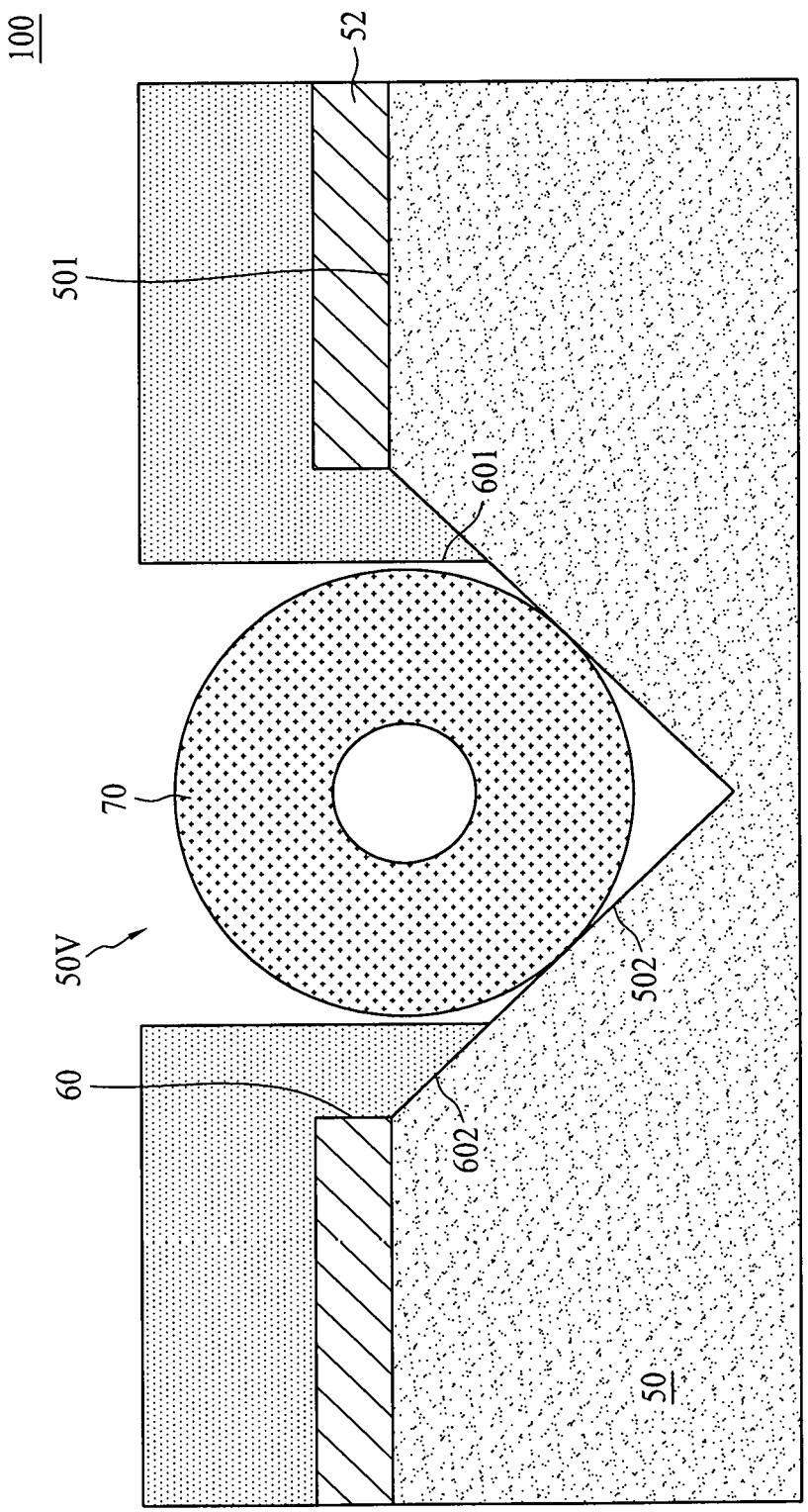
FIG. 6 is a cross-sectional view of an optical device package 100 in accordance with some embodiments of the present disclosure.

FIG. 6 is a cross-sectional view of an optical device package 100 in accordance with some embodiments of the present disclosure. As shown in FIG. 6, in comparison to the optical device package 9 of FIG. 5, the groove 50V of the optical device package 100 may have a triangular cross-sectional shape.

Figure 7A:
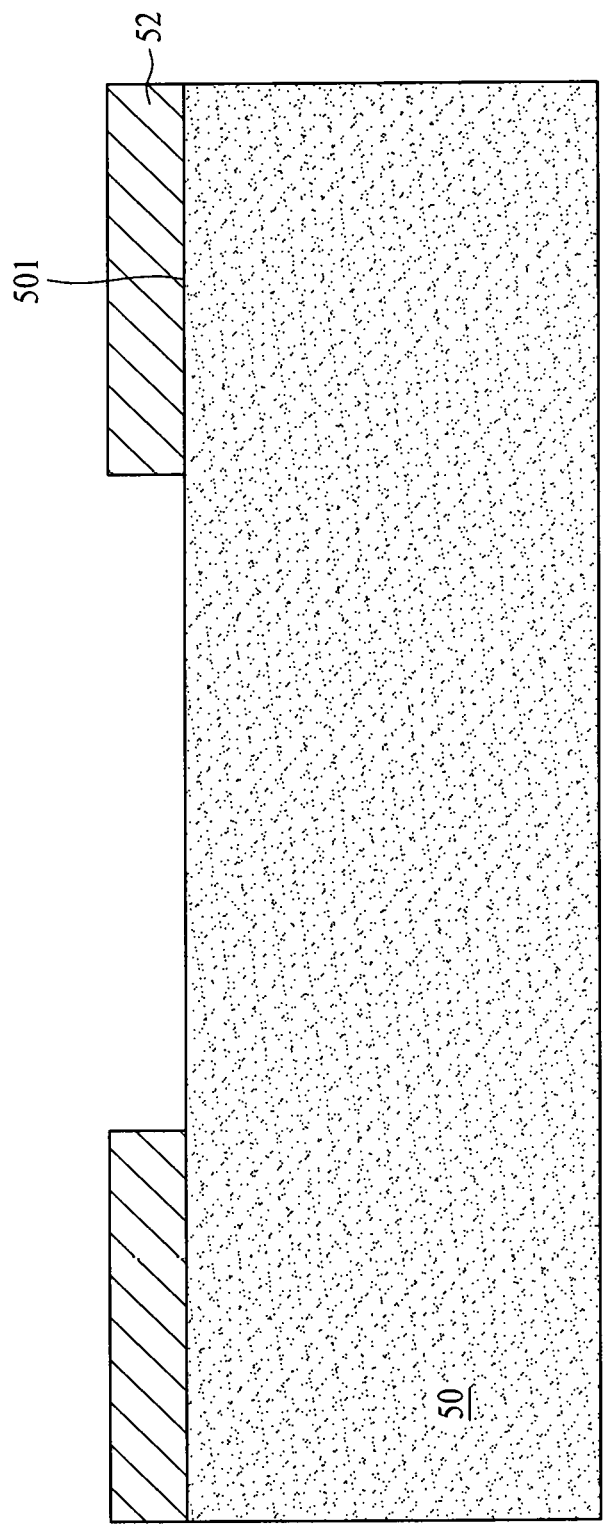
FIG. 7A, FIG. 7B and FIG. 7C are schematic diagrams illustrating a method of fabricating an optical device package in accordance with some embodiments of the present disclosure.
Figure 7B:
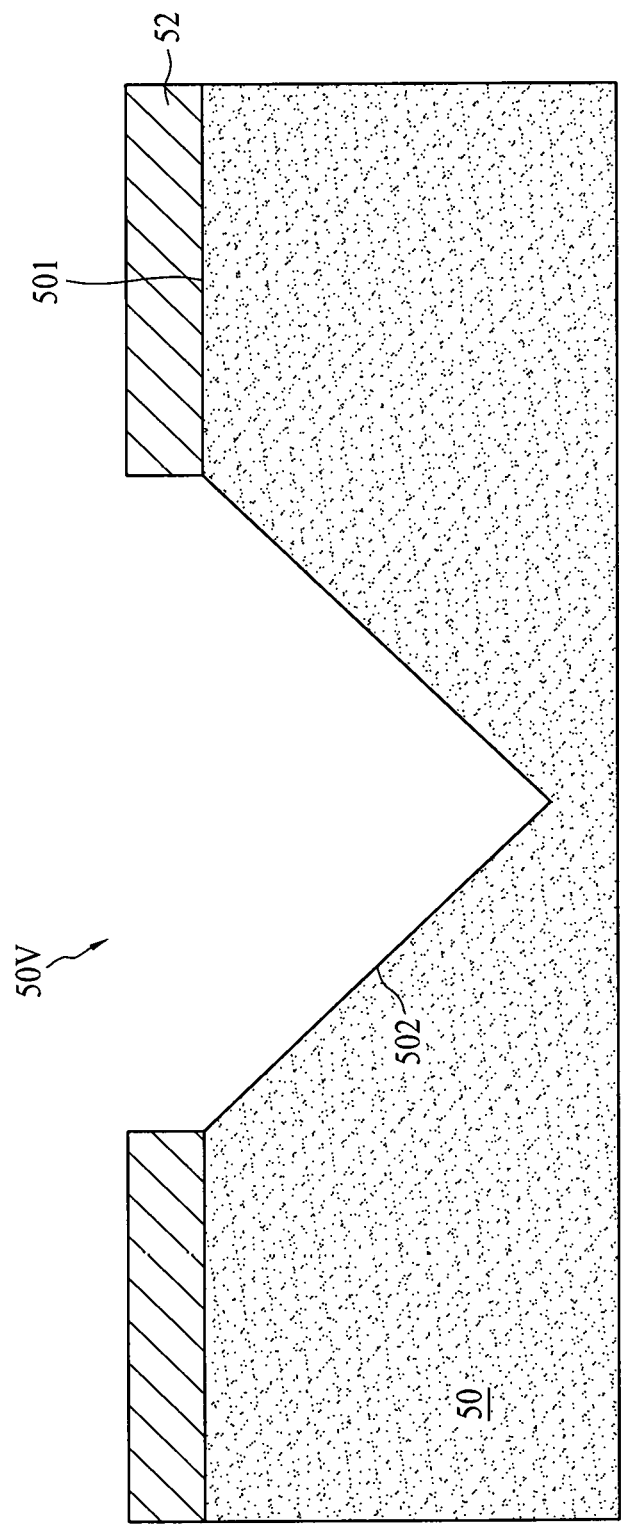
Figure 7C:
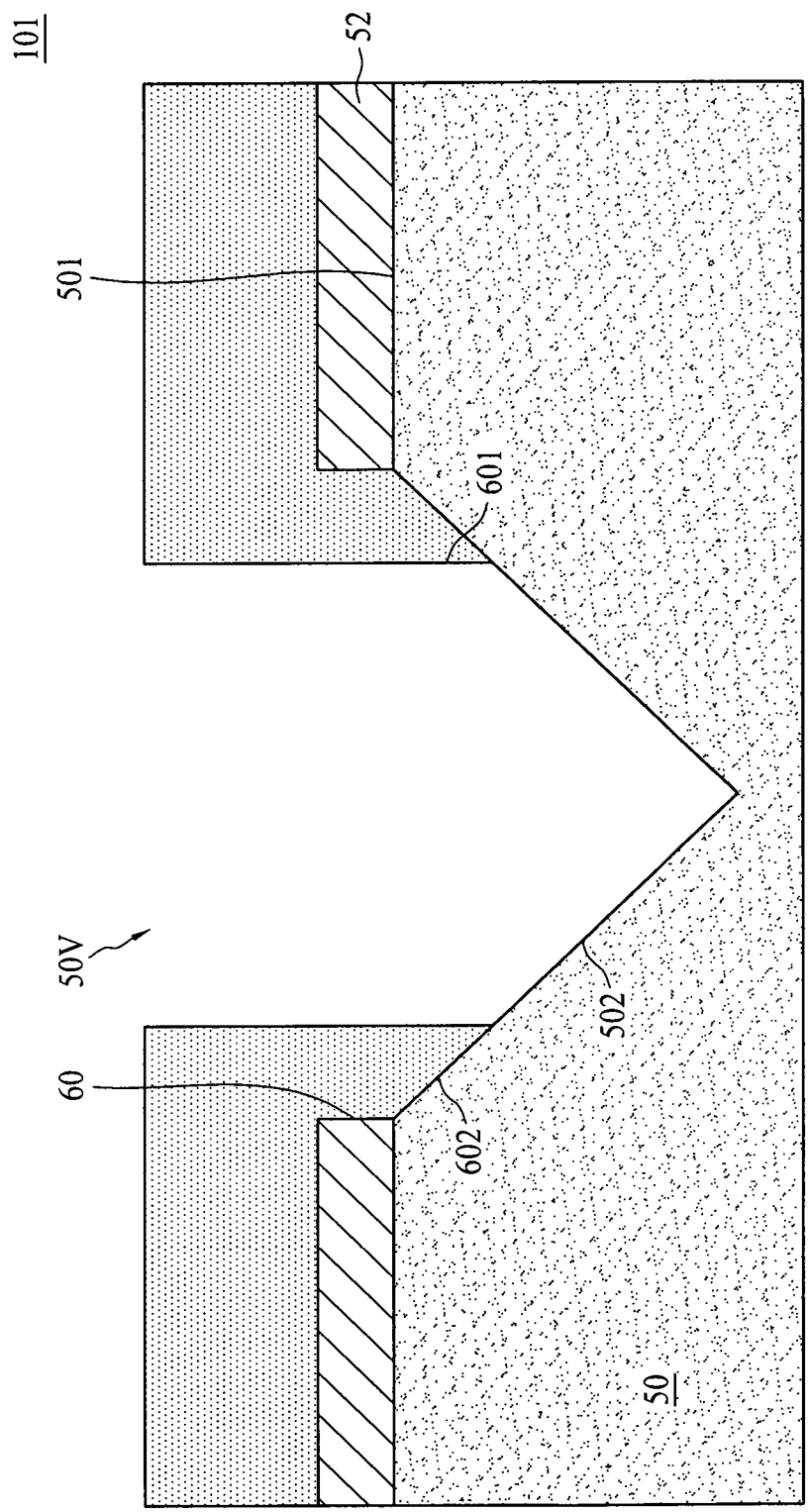

FIG. 7A, FIG. 7B and FIG. 7C are schematic diagrams illustrating a method of fabricating an optical device package in accordance with some embodiments of the present disclosure. As shown in FIG. 7A, a semiconductor substrate 50 such as a silicon substrate is received. In some embodiments, a protection layer 52 is formed on a first surface 501 of the semiconductor substrate 50. The protection layer 52 may be configured as a hard mask layer, partially covering the first surface 501. As shown in FIG. 7B, the semiconductor substrate 50 is patterned to form a groove 50V in the semiconductor substrate 50. In some embodiments, the groove 50V has a triangular cross-sectional shape. In some embodiments, the groove 50V may be formed by anisotropic etching. For example, an etching solution such as potassium hydroxide (HOH) solution or tetra-methyl ammonium hydroxide (TMAH) solution may be used to etch the semiconductor substrate 50. KOH solution and TMAH solution have different etching rates on different crystalline planes of the semiconductor substrate 50, and thus can be used to form the groove 50V of triangular cross-sectional shape.

As shown in FI. 7C, a spacer 60 is formed over the semiconductor substrate 50 and in the groove 50V. The spacer 60 has a first edge 601 substantially perpendicular to the first surface 501 of the semiconductor substrate 50, and a second edge 602 in contact with the second surface 502 of the semiconductor substrate 50.

The optical device 70 is disposed in the groove 50V of the semiconductor substrate 50 to form the optical device package 100 as shown in FIG. 6. By virtue of the spacer 60 with the vertical first edge 601, the verticality of the sidewalls of the groove 50V can be maintained. Accordingly, the overall space of the groove 50V can be reduced, which facilitates miniaturization of the optical device package 8. In addition, the optical device 70 can be securely fastened in the groove 50V.

Figure 8:
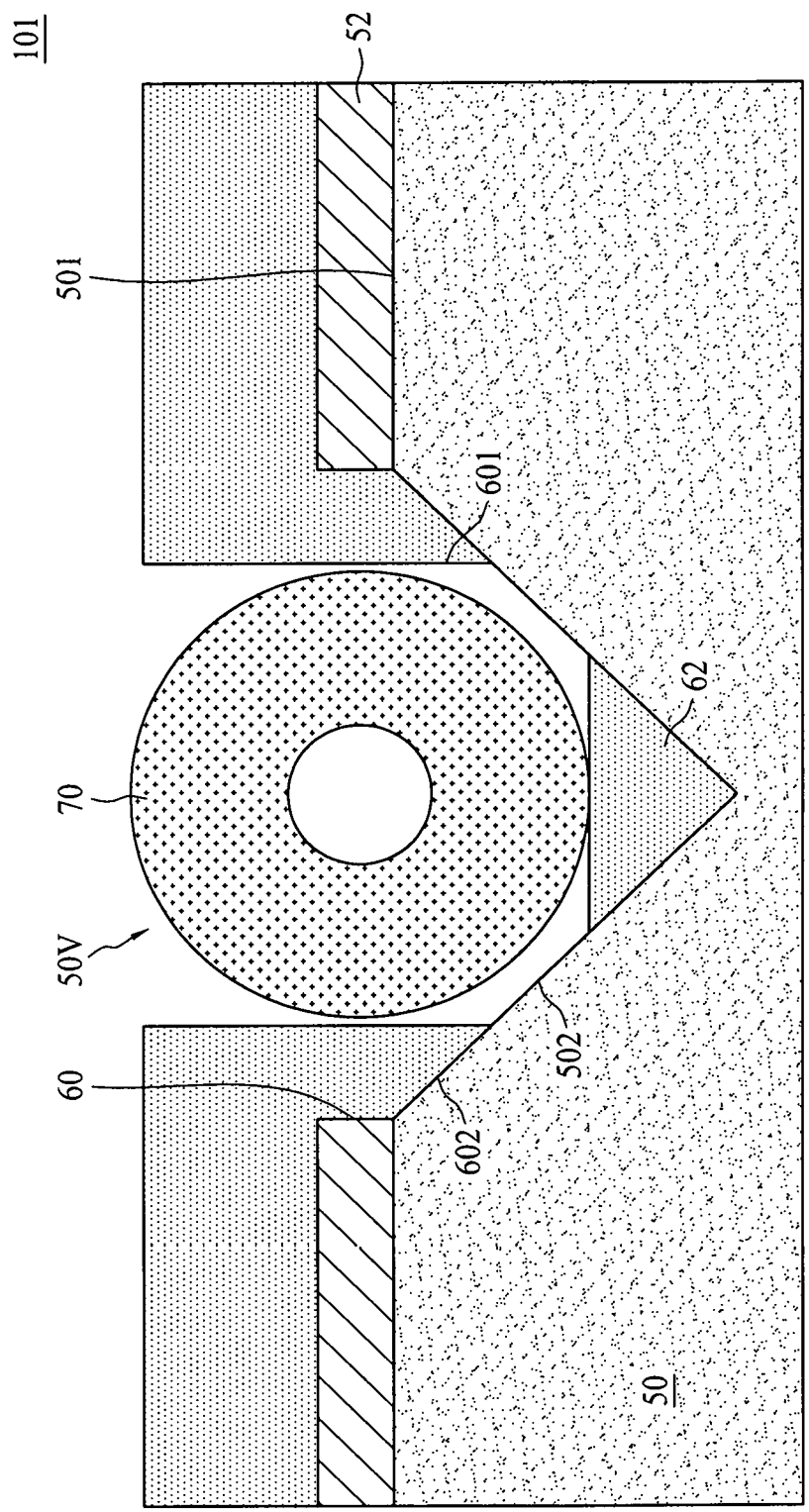
FIG. 8 is a cross-sectional view of an optical device package in accordance with some embodiments of the present disclosure.

FIG. 8 is a cross-sectional view of an optical device package 101 in accordance with some embodiments of the present disclosure. As shown in FIG. 8, in comparison to the optical device package 100 of FIG. 6, the optical device package 101 may further include a buffer layer 62 disposed between the second surface 602 and the optical device 70. The buffer layer 62 may planarize the bottom of the groove 50V. In some embodiments, the buffer layer 62 may be disconnected from the spacer 60. In some other embodiments, the buffer layer 62 may be connected to the spacer 60. The buffer layer 62 and the spacer 60 may include the same material such as photoresist material, but the present disclosure is not limited thereto. In some embodiments, the buffer layer 62 and the spacer 60 may be formed by the same process such as the same exposure and development process.

With the vertical first side surface 1031, the dimension of the groove 10V proximal to the first surface 101 and the dimension of the groove 10V proximal to the second surface 102 are substantially the same. Accordingly, the overall space of the groove 10V can be reduced, which facilitates miniaturization of the optical device package 1. In addition, the optical device 20 can be securely fastened in the groove 10V.

In some embodiments of the present disclosure, the optical device package includes a groove with a vertical sidewall to dispose an optical device. The vertical sidewall can reduce the overall space of the groove, which facilitates miniaturization of the optical device package. The vertical sidewall also allows the optical device to be fastened securely in the groove, enhancing alignment accuracy between the optical device and other optical elements.

As used herein, the singular terms "a," "an," and "the" may include a plurality of referents unless the context clearly dictates otherwise.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if the difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range were explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein are described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device package, comprising:
   a semiconductor substrate having a first surface, a second surface different in elevation from the first surface, and a profile connecting the first surface to the second surface, wherein a surface roughness of the profile is greater than a surface roughness of the second surface; and
   an optical device disposed on the second surface and surrounded by the profile.

2. The optical device package of claim 1, wherein the optical device is in contact with the second surface of the semiconductor substrate.

3. The optical device package of claim 1, wherein the profile comprises a first side surface connected to the first surface, a second side surface connected to the second surface, and a third side surface disposed between and connected to the first side surface and the second side surface.

4. The optical device package of claim 3, wherein the third surface is lower than the second surface.

5. The optical device package of claim 3, wherein the third surface is higher than the second surface.

6. The optical device package of claim 1, wherein the profile comprises a first side surface connected to the first surface, and a third surface disposed between and connected to the first side surface and the second surface.

7. The optical device package of claim 6, wherein the third surface is substantially leveled with the second surface.

8. The optical device package of claim 1, wherein the optical device comprises a tubular optical device having a curved outer surface.

9. The optical device package of claim 6, wherein the first side surface is substantially vertical with respect to the first surface.

10. The optical device package of claim 8, wherein the second surface includes a recessed and curved surface.

11. The optical device package of claim 10, wherein the recessed and curved surface of the second surface fits in a portion of the curved outer surface of the tubular optical device.

12. The optical device package of claim 1, wherein the first surface and the second surface are substantially parallel to each other.

13. The optical device package of claim 1, further comprising a protection layer disposed on the first surface.

14. An optical device package, comprising:
    a semiconductor substrate having a first surface, a second surface different in elevation from the first surface, and a profile connecting the first surface to the second surface, wherein the second surface includes a recessed and curved surface;
    an optical device disposed on the second surface and surrounded by the profile, wherein the recessed and curved surface of the second surface fits in a portion of a contour of the optical device; and
    a protection layer disposed on the first surface of the semiconductor substrate, wherein the protection layer includes an opening exposing the optical device,
    wherein a surface roughness of the profile is greater than a surface roughness of the second surface.

15. The optical device package of claim 14, wherein the profile comprises a first side surface connected to the first surface, and a third surface disposed between and connected to the first side surface and the second surface, and the first side surface is substantially vertical with respect to the first surface.

16. The optical device package of claim 14, wherein the opening is defined by a sidewall of the protection layer, and the sidewall of the protection layer is recessed from the profile of the semiconductor substrate.

17. An optical device package, comprising:
    a semiconductor substrate having a first surface, a second surface different in elevation from the first surface, and a profile connecting the first surface to the second surface, wherein the first surface, the second surface and the profile collectively define a groove, and a surface roughness of the profile is greater than a surface roughness of the second surface.

18. The optical device package of claim 17, further comprising a protection layer disposed on the first surface of the semiconductor substrate, wherein the protection layer includes an opening exposing the groove.

19. The optical device package of claim 18, wherein the opening is defined by a sidewall of the protection layer, and the sidewall of the protection layer is recessed from the profile of the semiconductor substrate.

\* \* \* \* \*